United States Patent
Kogure et al.

(10) Patent No.: US 10,407,001 B2
(45) Date of Patent: Sep. 10, 2019

(54) POWER SUPPLY DEVICE

(71) Applicant: Yazaki Corporation, Tokyo (JP)

(72) Inventors: Naoto Kogure, Shizuoka (JP); Kosuke Tomosada, Shizuoka (JP); Tsukasa Sekino, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/161,679

(22) Filed: Oct. 16, 2018

(65) Prior Publication Data

US 2019/0077343 A1 Mar. 14, 2019

Related U.S. Application Data

(63) Continuation of application No. PCT/JP2017/016006, filed on Apr. 21, 2017.

(30) Foreign Application Priority Data

May 16, 2016 (JP) .................................. 2016-097895
Jun. 17, 2016 (JP) .................................. 2016-120389

(51) Int. Cl.
  *B60R 16/02* (2006.01)
  *B60R 16/03* (2006.01)
  (Continued)

(52) U.S. Cl.
  CPC ............. *B60R 16/0215* (2013.01); *B60J 5/06* (2013.01); *B60R 16/02* (2013.01); *B60R 16/03* (2013.01);
  (Continued)

(58) Field of Classification Search
  CPC ...... B60R 16/0215; B60R 16/027; B60J 5/06; H02G 11/00
  See application file for complete search history.

(56) References Cited

U.S. PATENT DOCUMENTS

2010/0243317 A1* 9/2010 Katou .................... B60R 16/027
  174/72 A
2013/0000941 A1* 1/2013 Taniguchi ........... B60R 16/0215
  174/68.3
(Continued)

FOREIGN PATENT DOCUMENTS

JP      2003-341446 A     12/2003
JP      2012-96682 A       5/2012
(Continued)

OTHER PUBLICATIONS

International Search Report and Written Opinion of the International Search Report for PCT/JP2017/016006 dated Jul. 18, 2017.
(Continued)

*Primary Examiner* — Hoa C Nguyen
*Assistant Examiner* — Amol H Patel
(74) *Attorney, Agent, or Firm* — Kenealy Vaidya LLP

(57) ABSTRACT

Provided is an electric power supply device in which exposure of a wire harness can be reduced in a slide door and interference with door trim can be minimized. When a slide door is half opened, a wire harness bends convexly downward, and one portion thereof is positioned lower than when the slide door is fully open or fully closed. Specifically, the wire harness is bent three-dimensionally. This makes it easier for the wire harness to be pulled out from a bottom end of door trim, and makes it possible for interference between the wire harness and the door trim to be minimized. The wire harness may be also bent three-dimensionally as appropriate in accordance with a shape of the door trim, reducing exposure of the wire harness in the slide door.

3 Claims, 18 Drawing Sheets

(51) Int. Cl.
*B60J 5/06* (2006.01)
*H02G 3/04* (2006.01)
*H02G 11/00* (2006.01)
*E05F 15/689* (2015.01)

(52) U.S. Cl.
CPC ............ *H02G 3/04* (2013.01); *H02G 3/0462* (2013.01); *H02G 11/00* (2013.01); *E05F 15/689* (2015.01); *E05Y 2400/654* (2013.01); *E05Y 2900/55* (2013.01)

(56) References Cited

U.S. PATENT DOCUMENTS

| | | | |
|---|---|---|---|
| 2013/0214099 A1* | 8/2013 | Okumura | B60R 16/027 248/74.3 |
| 2014/0238740 A1* | 8/2014 | Inoue | H02G 11/006 174/72 A |
| 2017/0117691 A1* | 4/2017 | Hagi | B60R 16/0215 |

FOREIGN PATENT DOCUMENTS

| | | |
|---|---|---|
| JP | 2013-162716 A | 8/2013 |
| JP | 2015-74431 A | 4/2015 |
| WO | 2011/118063 A1 | 9/2011 |

OTHER PUBLICATIONS

Japanese Office Action for the related Japanese Patent Application No. 2016-120389 dated Jun. 19, 2018.

* cited by examiner

POWER SUPPLY DEVICE

TECHNICAL FIELD

The present invention relates to a power supply device for supplying power from a vehicle body to a slide door in a vehicle having a slide door.

BACKGROUND ART

Generally, a vehicle equipped with a slide door is provided with a power supply device for supplying power from a vehicle body to the slide door. That is, the wire harness of the power supply device electrically connects a battery etc. mounted on the vehicle body and an electrical component provided on the slide door so that electric power is supplied. In such a power supply device, it is preferable to make the wire harness less exposed in the slide door, and thus such configuration was sometimes adapted that the wire harness is hidden by the door trim and is drawn out from a lower end or front and rear ends of the door trim toward the vehicle body.

However, since the wire harness is bent along with sliding of the slide door, the above-described configuration may change a withdrawal position of the wire harness from the door trim. As a result, the door trim and the wire harness interfere with each other, resulting in various inconveniences. For example, an exterior member (corrugated tube or the like) of the wire harness may be caught by the door trim, and when the catch is released, the exterior member abruptly resiliently returns to generate abnormal noises.

Therefore, a power supply device that attempts to suppress abnormal noises has been proposed (see, for example, Patent Document 1). In the power supply device described in Patent Document 1, since the protruding portion is provided in the corrugated tube and the protruding portion is formed to have a larger diameter than the other portions, the door trim is difficult to be caught, suppressing abnormal noises from occurring.

PATENT LITERATURE

Patent Document 1: Japanese Unexamined Patent Publication No. 2015-74431

DISCLOSURE OF THE INVENTION

Problem to be Solved by Invention

However, the power supply device described in Patent Document 1, although preventing the corrugated tube from being caught by the door trim, cannot suppress an interference itself. It is conceivable that a degree of interference between the wire harness and the door trim is large (for example, when a lower end position of the door trim is low, etc.), the slide door may be hindered from sliding or the wire harness may be damaged. Therefore, it is conceivable to deal with a process of cutting or otherwise processing the door trim so as not to interfere with the wire harness, but resulting in that the wire harness tends to be easily exposed.

An object of the present invention is to provide a power supply device capable of reducing an exposure of a wire harness in a slide door and suppressing interference with a door trim.

Means for Solving the Problem

In order to solve the above problems and achieve the object, the invention of one aspect is a power supply device for supplying power from a vehicle main body to a slide door in a vehicle having the slide door sliding along a traveling direction, the power supply device including: a wire harness provided from the vehicle main body to the slide door; a main body side unit having a main body side support portion for supporting a main body side end portion of the wire harness, and fixable to the vehicle main body; and a door side unit having a door side support portion for supporting a door side end portion of the wire harness, and fixable to the slide door, wherein the wire harness is bent convexly downward, so that at least a portion of the sire harness between the main body side end portion and the door side end portion is located lower when the slide door is in a half opened state than when the slide door is in the fully opened state or the fully closed state.

Preferably, in the invention, the door side unit swingably supports the wire harness about a swing axis along a vehicle width direction so as to turn downward the door side end portion when the slide door is in the half opened state, more inclines the door side end portion toward one side in the traveling direction when the slide door is in the fully closed state than when the slide door is in the half opened state, and more inclines the door side end portion toward another side in the traveling direction when the slide door is in the fully opened state than when the slide door is in the half opened state.

Preferably, in the present invention, the door side unit includes a swing support portion configured separately from the door side support portion and swingably supporting a position nearer than a center of the wire harness than the door side end portion.

Preferably, in the present invention, the main body side support portion rotatably supports the main body side end portion about a rotation axis along a longitudinal direction of the wire harness.

Preferably, in the invention, the wire harness includes one or more electric wires, a corrugated tube covering an outer periphery of the electric wire, and a bending restricting member provided on a side of the vehicle main body, wherein the bending restricting member extends along the electric wire, and has a bending allowance direction that allows bending and a bending restricting direction that faces an opposite side of the bending allowance direction and restricts bending, the main body side support portion supports the main body side end portion so as to extend along a horizontal plane, and the bending restricting member turns the bending restricting direction upward when the slide door is in the half opened state.

Preferably, in the present invention, the corrugated tube is formed in a cylindrical shape.

Preferably, in the present invention, the door side support portion rotatably supports the door side end portion about the rotation axis along the longitudinal direction of the wire harness, wherein the wire harness includes one or more electric wires and a chain member provided on the outer periphery of the electric wire, the chain member has a bendable direction in which a whole of the chain member is bendable and an unbendable direction crossing the bendable direction, and the entire wire harness rotates as the slide door slides, and the chain member changes direction.

Preferably, in the present invention, the wire harness includes one or more electric wires for supplying electric power from the vehicle main body to the slide door and a tubular exterior member covering an outer periphery of the electric wire, wherein the door side unit includes a swing supporting portion for swingably supporting the exterior member at a position apart from the end portion on a side of the slide door and a fixing portion fixing the harness directly or indirectly to the slide door at the side of the slide door nearer to the swing supporting portion.

Preferably, in the present invention, the swing supporting portion swingably supports the exterior member about a swing axis along the vehicle width direction.

Preferably, in the present invention, the fixing portion fixes the wire harness such that an end portion of the exterior member on the side of the slide door turns horizontally or downward.

Preferably, in the present invention, the exterior member is a corrugated tube formed at least partly in a bellows shape in the longitudinal direction.

Advantages of the Invention

According to the one aspect of the present invention, since when the slide door is in the half opened state, the wire harness is bent downwardly, and at least the part of the wire harness is positioned below the case where the slide door is in the fully opened state or the fully closed state, the wire harness can be bent three-dimensionally. That is, the wire harness can be bent not only in the plane (horizontal plane) including the traveling direction (sliding direction) and the vehicle width direction but also in the space including the vertical direction. By thus bending the wire harness three-dimensionally and moving at least the part of the wire harness downward in the half opened state of the slide door, the wire harness can be easily pulled out from the lower end of the door trim, interference between the wire harness and the door trim can be suppressed. Further, it is only necessary to appropriately bend the wire harness three-dimensionally according to the shape of the door trim or the like to suppress the interference, reducing the exposure of the wire harness in the slide door.

According to the present invention, the wire harness is swingably supported about the swing axis along the vehicle width direction, so that when the slide door is slid along the traveling direction, the wire harness can be easily bent three-dimensionally. In addition, compared with the configuration in which the main body side end portion is swung, the portion of the wire harness on the side of the slide door easily extends downward in the half opened state, and the wire harness can be easily pulled out from the lower end of the door trim.

According to the present invention, since the swing support portion for swingably supporting the wire harness is formed separately from the door side support portion for supporting the door side end portion of the wire harness, it is possible to simplify the structure of the swing support portion and to reduce the number of parts, as compared with a configuration in which these are integrated (configuration in which the door side end portion is swingably supported by the door side support portion). That is, even though the electric wire is pulled out from the end portion of the wire harness and the structure of the door side end portion tends to be complicated, the configuration can be simplified because the support at the door side end portion and the support for swing are different.

According to the present invention, the main body side end portion of the wire harness is rotatably supported about the longitudinal direction, whereby when the wire harness is bent three-dimensionally, the wire harness is hard to be twisted and can be less subjected to damage.

According to the invention, since the bending restricting member provided in the wire harness has the bending allowance direction and the bending restricting direction in which the bending restricting direction faces the opposite side of the bending allowance direction, the wire harness can be easily bent convexly in a desired direction, but hardly bent convexly on the opposite side. Since the main body side end portion of the wire harness is rotatably supported, the bending restricting member can change direction along with sliding of the slide door, and the direction in which the wire harness is allowed to bend is appropriately changed, so that the wire harness can be easily bent three-dimensionally.

Further, since the bending restricting direction faces upward in the half opened state of the slide door, the main body side end portion that is supported so as to extend along the horizontal plane can be prevented from being bent convexly upward when the entire wire harness attempts to bend downward convexly, and damage to the wire harness can be suppressed.

According to the present invention, since the corrugated tube is formed into a cylindrical shape, it can be easily manufactured and cost can be reduced as compared with a configuration using a corrugated tube having anisotropy with respect to easy bending (for example, a corrugated tube having an elliptical cross section). In addition, even if a corrugated tube having isotropy is used for easy bending, providing the bending restricting member as described above can easily bend the wire harness three-dimensionally.

According to the present invention, since the chain member of the wire harness has the bendable direction and the unbendable direction intersecting with the bendable direction, the wire harness can be easily bent into a convex shape in a desired direction, and hardly bent convexly in the intersecting direction. In addition, the whole wire harness rotates along with the sliding of the slide door, and the chain member changes direction, whereby the direction in which the wire harness can bend is changed according to the state of the slide door, and the wire harness can be easily bent three-dimensionally.

MODE FOR CARRYING OUT THE INVENTION

Figure 1:
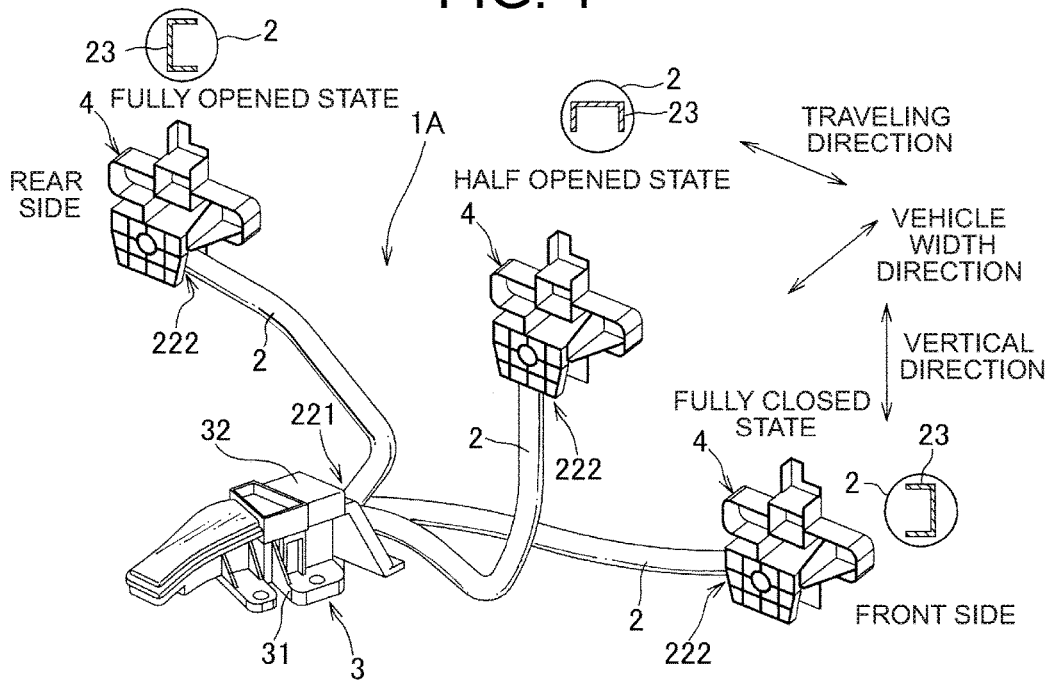
FIG. 1 is a perspective view showing a power supply device according to a first embodiment of the present invention.

Hereinafter, each embodiment of the present invention will be described with reference to the drawings. In the second embodiment, the same constituent members as those described in the first embodiment and the constituent members having similar functions are denoted by the same reference numerals as those in the first embodiment, and a description thereof will be omitted.

[First Embodiment]

Figure 2:
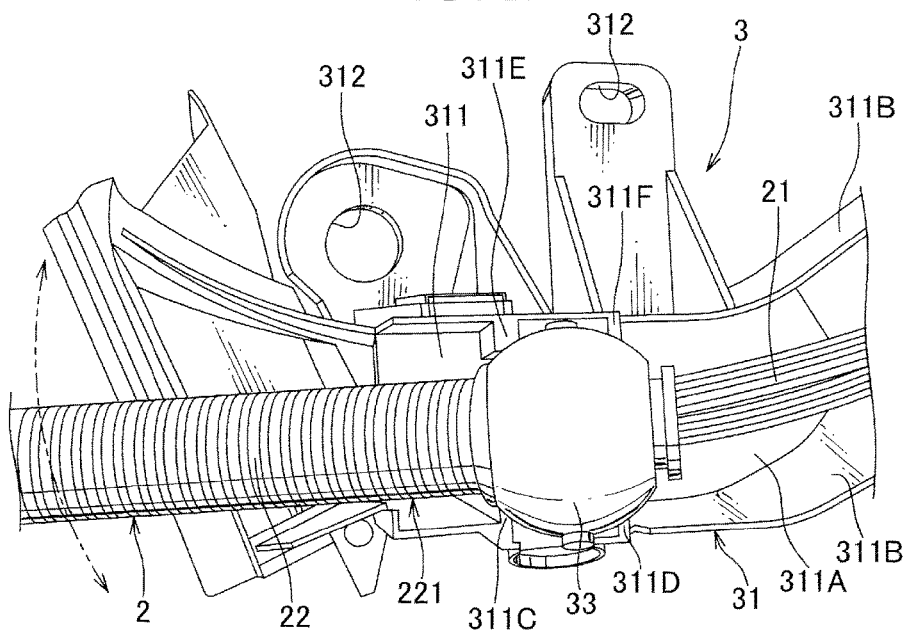
FIG. 2 is a perspective view showing a main part of a main body side unit of the power supply device.
Figure 3:
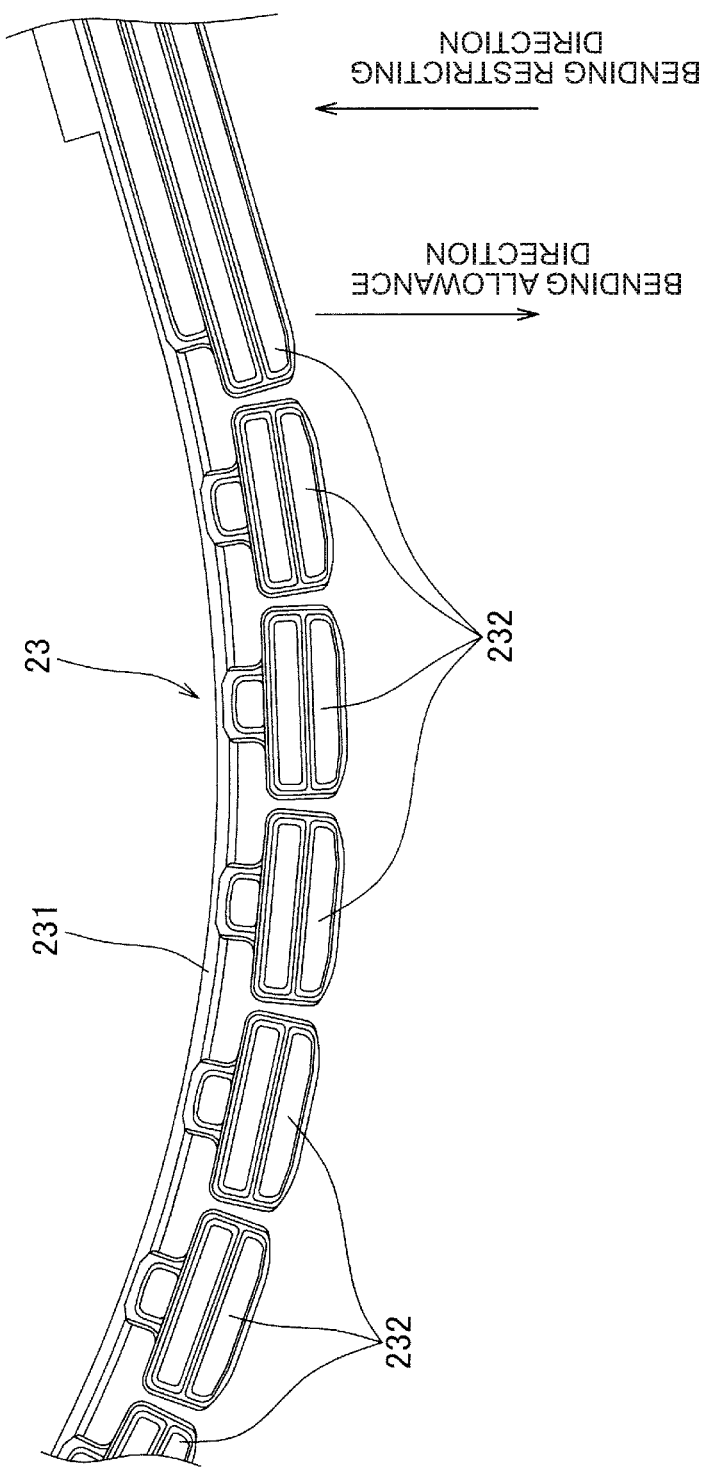
FIG. 3 is a side view showing a bending restricting member provided in a wire harness of the power supply device.
Figure 4:
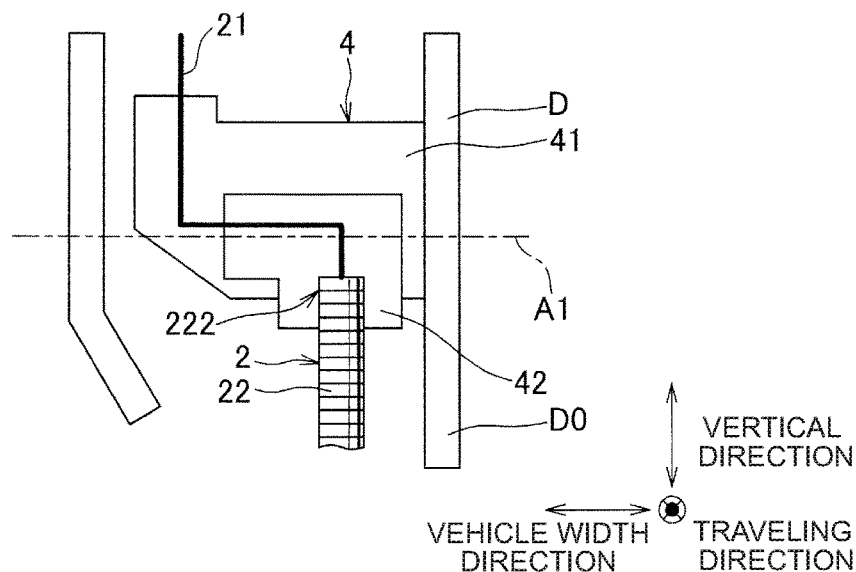
FIG. 4 is a front view showing a door side unit of the power supply device.
Figure 5:
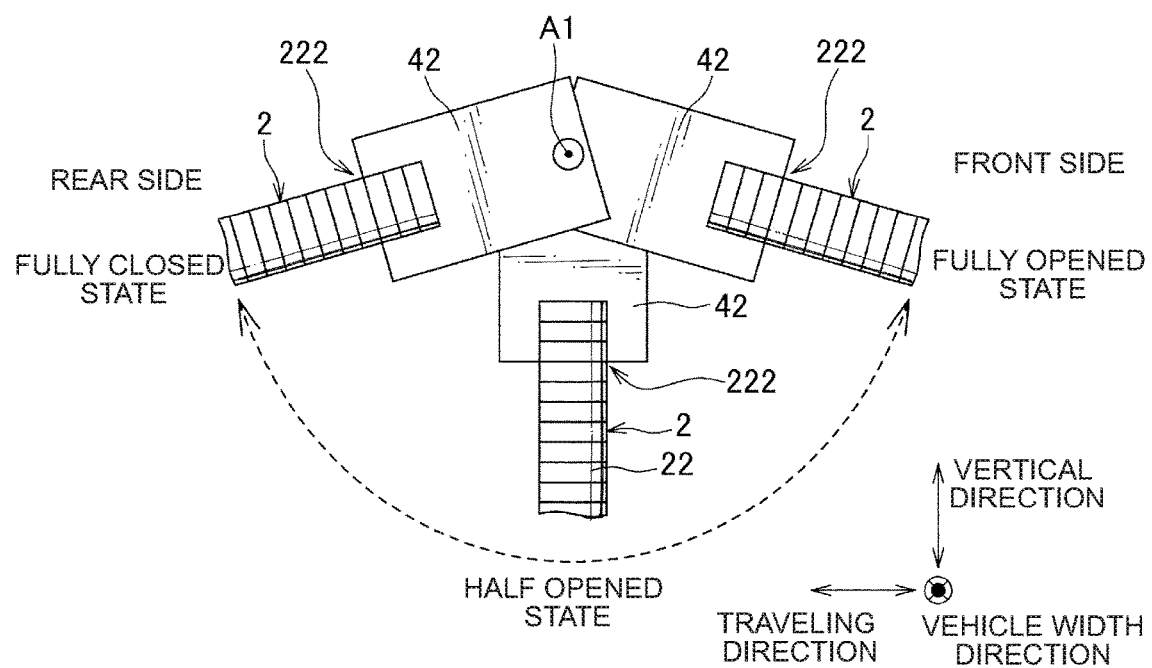
FIG. 5 is a side view showing a main part of the door side unit.
Figure 6A:
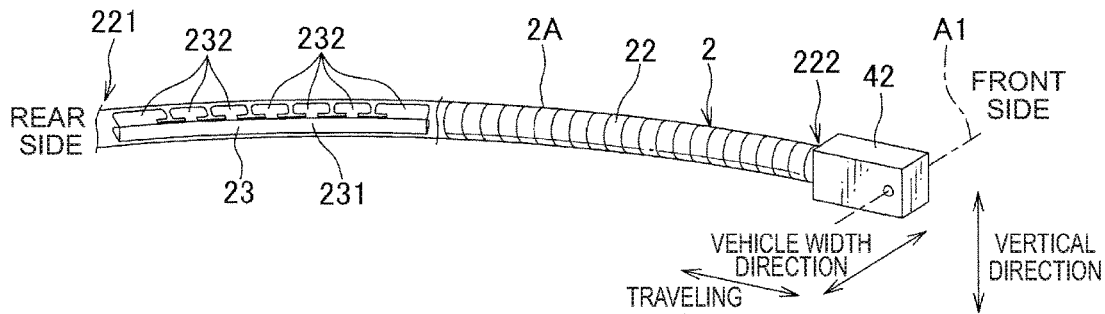
FIGS. 6(A) to 6(C) are perspective views showing how the wire harness is bent when the slide door slides in the vehicle provided with the power supply device.
Figure 6B:
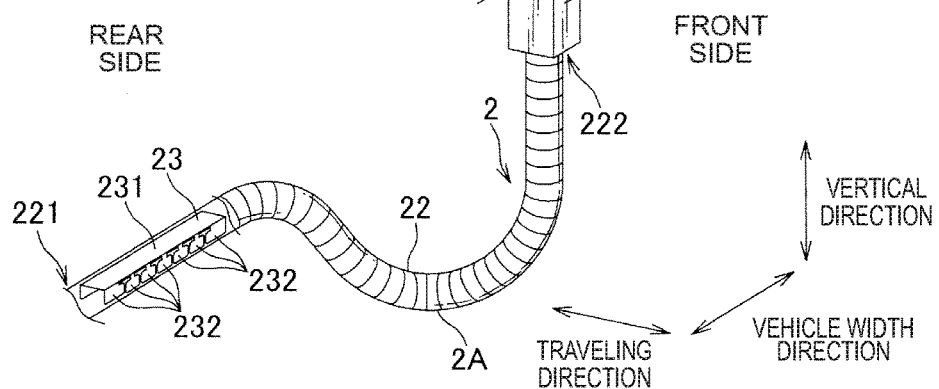
Figure 6C:
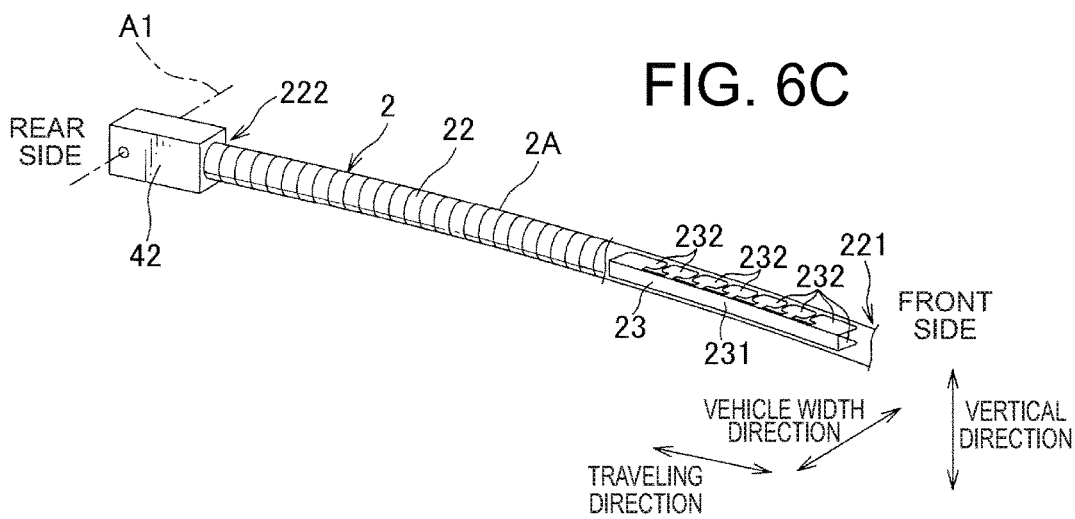

Hereinafter, a first embodiment of the present invention will be described with reference to the drawings. FIG. 1 is a perspective view showing a power supply device 1A according to a first embodiment of the present invention, FIG. 2 is a perspective view showing a main part of a main body side unit 3 of the power supply device 1A, FIG. 3 is a perspective view showing a bending restricting member 23 provided in a wire harness 2 of the power supply device 1A, FIG. 4 is a front view showing the door side unit 4 of the power supply device 1A, FIG. 5 shows a main portion of the door side unit 4, and FIGS. 6(A) to 6(C) are perspective views showing how the wire harness 2 is bent when the slide door slides in a vehicle provided with the power supply device 1A.

The power supply device 1A according to the present embodiment is provided in a vehicle having a slide door that slides along a traveling direction and is for supplying power from the vehicle body to the slide door, and is, as shown in FIG. 1, provided with a wire harness 2, a main body side unit 3, and a door side unit 4. FIG. 1 shows the state of the power supply device 1A in a fully closed state, a half opened state, and a fully opened state of the slide door. The slide door is provided on the side surface of the vehicle and slidably opens toward the rear side in the traveling direction and also moves somewhat in the vehicle width direction at the time of sliding so as not to interfere with the vehicle body.

In the present embodiment, the half opened state of the slide door means a state in which the slide door is positioned substantially at the center position in the entire movable range, but also a state in which the door side unit 4 is closest to the main body side unit 3 so that the wire harness 2 is most bent, or an appropriate state between the fully opened state and the fully closed state.

The wire harness 2 is provided across the vehicle body and the slide door, and as shown in FIGS. 2, 3, 6(A), 6(B) and 6(C), includes a plurality of electric wires 21, a corrugated tube 22 covering the outer periphery of the electric wires 21, and a bending restricting member 23 provided on the side of the vehicle body. Note that the electric wire 21 is omitted for convenience of explanation in FIGS. 6(A) to 6(C). Further, when the wire harness 2 rotates about the rotation axis along its longitudinal direction as will be described later, it is assumed that the corrugated tube 22 rotates. At this time, the bending restricting member 23 rotates together with the corrugated tube 22, and the electric wire 21 may or may not rotate.

The electric wire 21 is electrically connected to a battery mounted on the vehicle body and is electrically connected to an electrical component (such as a speaker or a power window) provided on the slide door, and supplies electric power from the battery to the electrical component. Although the electric wire 21 is formed to be longer than the corrugated tube 22, a portion of the electric wire 21 contained in the corrugated tube 22 constitutes the wire harness 2, and an end portion of the corrugated tube 22 is regarded as the entire wire harness 2.

The corrugated tube 22 is formed in a cylindrical shape with synthetic resin, for example, and the main body side end portion 221 is connected to a ball portion 33 described later, and the door side end portion 222 is connected to a swinging member 42 which will be described later.

The bending restricting member 23 is formed of a member which has adequate elasticity (synthetic resin for example), and as shown in FIGS. 3 and 6(A) to 6(C), includes a band plate portion 231 and a plurality of restricting portions 232 erected vertically from both sides in the width direction in the band plate portion 231. In addition, the bending restricting member 23 is provided inside the corrugated tube 22 together with the electric wire 21, surrounds the electric wire 21 by the band plate portion 231 and the restricting portion 232, and extends along the electric wire 21.

The band plate portion 231 is flexurally deformed by an external force in a plane perpendicular direction and hardly deformed by an external force in an in-plane direction. In addition, the plurality of restricting portions 232 is formed in a T shape and a plate shape, and adjacent ones thereof are in contact with each other when the band plate portion 231 has a flat plate shape, and it is isolated when the band plate portion 231 is flexed and deformed convexly toward one side in the plane perpendicular direction (toward the restricting portion 232). That is, the plurality of restricting portions 232 allows the band plate portion 231 to flex and deform in a convex shape toward the one side in the plane perpendicular direction, and restricts flexure deformation that protrudes toward the other side.

Therefore, in the bending restricting member 23, a direction toward one side perpendicular to the plate of the band plate portion 231 is set as the bending allowance direction allowing the wire harness 2 to bend, and the direction toward the opposite side (the other side) is set as a bending restricting direction that regulates bending of the harness 2. It is to be noted that the wire harness 2 is not excessively bent due to the elasticity of the band plate portion 231 also in the bending allowance direction. In addition, the bending restricting member 23 is hardly bent or twisted in the other direction, and the wire harness 2 hardly bends.

Providing such a bending restricting member 23 restricts bending of the wire harness 2 as described later. In addition, the bending restricting member 23 has such a length as to be provided over a predetermined range with respect to the entire corrugated tube 22.

As shown in FIGS. 1 and 2, the main body side unit 3 includes a base portion 31 fixed to the vehicle body, a lid portion 32 assembled to the base portion 31, and a main body side end portion 221 of the wire harness 2 and a spherical ball portion 33 to be formed, for example, in the vicinity of the side sill.

The base portion 31 is made of synthetic resin, for example, and has a guide portion 311 and a fixing hole 312 formed outside the guide portion 311 and through which a fixing member for fixing to the vehicle body is inserted. The guide portion 311 has a bottom surface portion 311A and a pair of standing walls 311B erected from the bottom surface portion 311A and opens upward. The lid portion 32 is assembled to the base portion 31 so as to cover the opening so that a cylindrical portion is formed. The wire harness 2 and a protruding portion of the electric wire 21 protruded from the wire harness 2 are arranged and guided in the cylindrical portion.

A total of four support protrusions 311C to 311F protruding so as to approach each other are formed in the pair of standing walls 311B, two support protrusions 311C and 311D are formed on one standing wall 311B, and two support protrusions 311E and 311F are formed on the other standing wall 311B. The distance between the supporting protrusions 311C, 311E formed on the mutually different standing walls 311B and facing each other is smaller than the diameter of the ball portion 33, and the same is true for the opposing supporting protrusions 311D, 311F. The distance between the support protrusions 311C and 311D formed on the same standing wall 311B is smaller than the diameter of the ball portion 33, and the same is true for the support protrusions 311D and 311F.

Providing the ball portion 33 so as to be surrounded by the four support protrusions 311C to 311F and assembling the lid portion 32 restrict the ball portion 33 from moving in the longitudinal direction of the wire harness 2, and allow the ball portion 33 to be rotatable within the support projections 311C to 311F. Since the ball portion 33 is fixed to the main body side end portion 221 of the wire harness 2, the main body side end portion 221 is rotatably supported as a shaft in the longitudinal direction of the wire harness 2 by the base portion 31, the lid portion 32, and the ball portion 33. That is, the base portion 31, the lid portion 32, and the ball portion 33 function as a main body side support portion.

The guide portion 311 is made such that the distance between the pair of standing walls 311B increases from the support protrusions 311C to 311F toward the slide door side, and opens on the slide door side, and the main body side end portion 221 of the wire harness 2 extends along the horizontal plane (a plane including the traveling direction and the vehicle width direction), and is supported so as to oscillate within the horizontal plane.

As shown in FIG. 4, the door side unit 4 has a fixing portion 41 fixed to the slide door D and a swinging member 42 fixed to the door side end portion 222 of the wire harness 2, and is arranged at the similar height of the main body side unit 3 or at a position higher than the main body side unit 3. The slide door D includes a door main body DO which constitutes the outside surface of the vehicle body, and a door trim T which is provided on the inside of the passenger compartment of the door main body DO. The door side unit 4 is provided in the space between the door body DO and the door trim T by being fixed to the fixed body 41 on the interior side of the door body DO so that the wire harness 2 is concealed by the door trim T.

A convex or concave shaft portion is formed at both ends of the swing member 42 in the vehicle width direction. The fixed portion 41 sandwiches the swing member 42 from the vehicle width direction and supports the shaft portion, whereby the swing member 42 can swing about a swing axis A1 along the vehicle width direction. At this time, the wire harness 2 is supported so as to extend along the door body DO as shown in FIG. 4. Since the swing member 42 is fixed to the door side end portion 222 of the wire harness 2, the door side end portion 222 is supported swingably about the swing axis A1 along the vehicle width direction by the fixed portion 41 and the swing member 42. That is, the fixing portion 41 and the swinging member 42 function as a door side supporting portion.

As such, the swing member 42 swings and whereby the door side end portion 222 of the wire harness 2, as shown in FIG. 5, turns to the rear side in the traveling direction when the slide door D is in the fully closed state, turns downward when in a half opened state and turns to the front side in the traveling direction when fully opened.

How the wire harness 2 bends when the slide door D slides will be described below with reference to FIGS. 6(A) to 9(C). FIGS. 6(A) to 6(C) show a section of the corrugated tube 22 where the bending restricting member 23 is provided. FIG. 1 schematically shows the position of the bending restricting member 23 in the wire harness 2 in each state, and shows a cross section of the wire harness 2 as viewed from the side of the main body side unit 3.

Figure 7A:
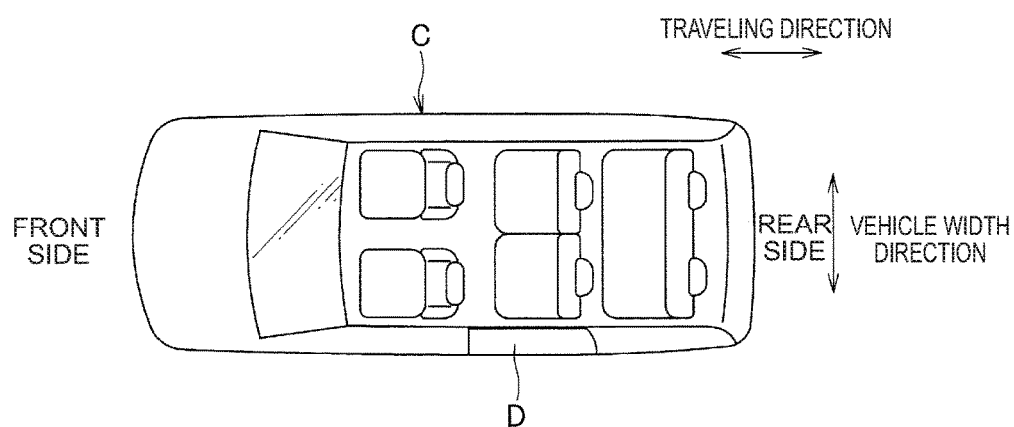
FIG. 7(A) is a plan view showing a state of the entire vehicle when the slide door is fully closed.
Figure 7B:
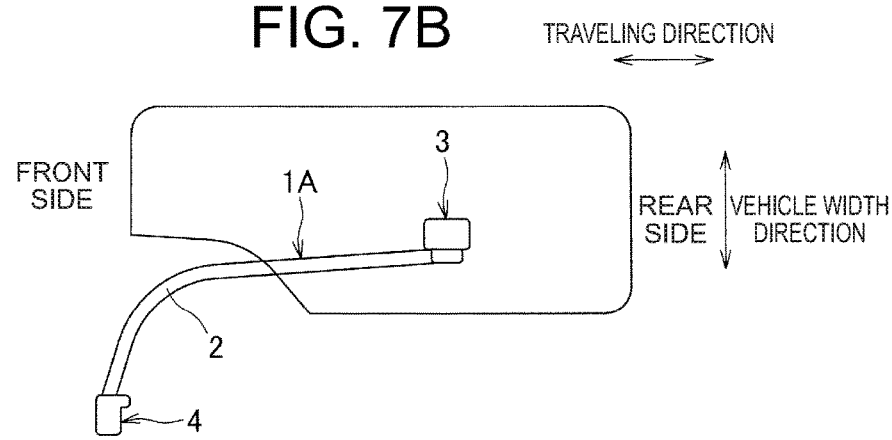
FIG. 7(B) is a plan view showing the state of the power supply device.
Figure 7C:
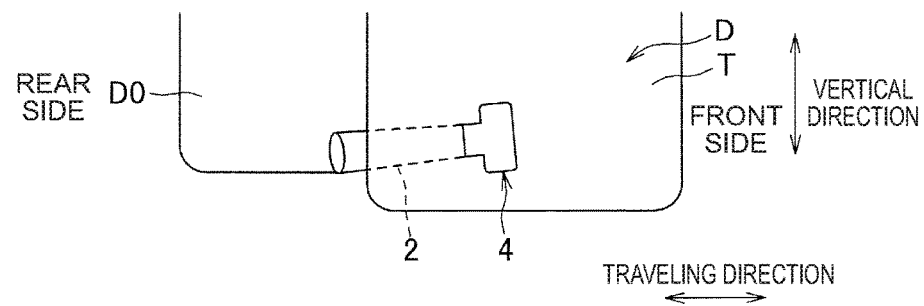
FIG. 7(C) is a side view showing the relationship between the slide door and the wire harness, as seen from the inside of the vehicle.

FIG. 6(A) shows the wire harness 2 when the slide door D is in the fully closed state and FIGS. 7(A) to 7(C) show the state of the entire vehicle C when the slide door D is in the fully closed state, and the state of the power supply device 1A, and the relationship between the slide door D and the wire harness 2 as seen from the inside of the vehicle. At this time, the door side unit 4 is positioned on the front side in the traveling direction with respect to the main body side unit 3, and the wire harness 2 extends from the door side unit 4 toward the rear side. In addition, in the bending restricting member 23 of the wire harness 2, the band plate portion 231 faces the inside of the vehicle in the vehicle width direction. At this time, the entire wire harness 2 extends in the horizontal plane and hardly bends in the vertical direction. As shown in FIG. 7(C), the wire harness 2 extending from the door side unit 4 toward the rear side is pulled out toward the main body side unit 3 so as to pass through the rear end of the door trim T of the slide door D.

Figure 8A:
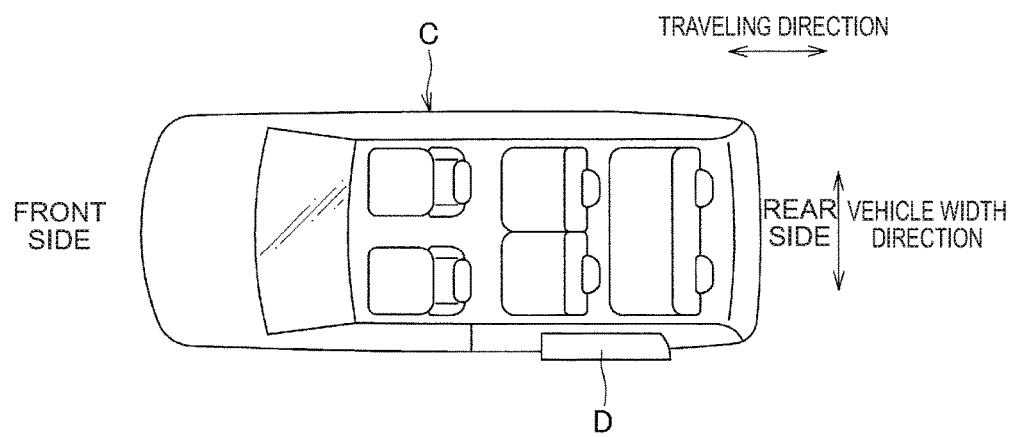
FIG. 8(A) is a plan view showing the state of the entire vehicle when the slide door is in a half opened state.
Figure 8B:
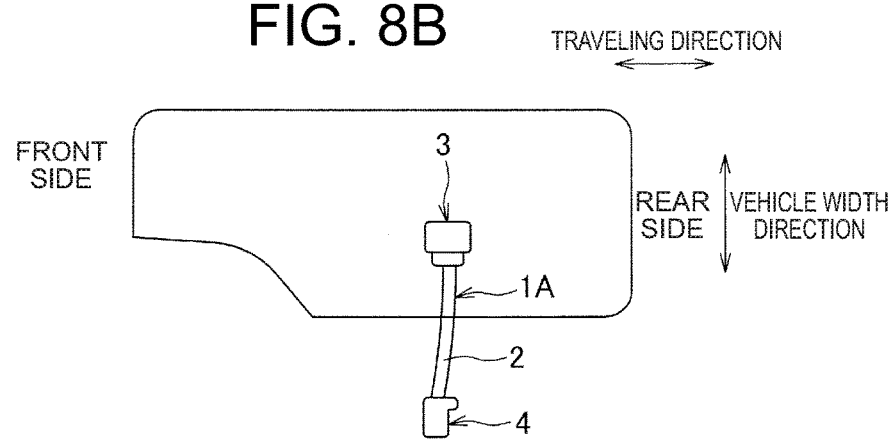
FIG. 8(B) is a plan view showing a state of the power supply device.
Figure 8C:
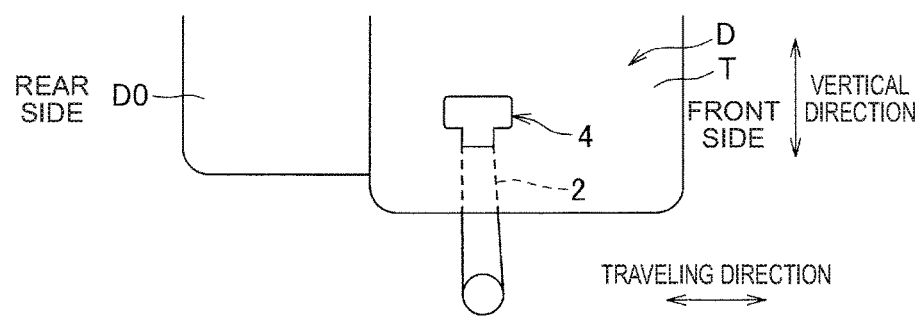
FIG. 8(C) is a side view showing a relationship between the slide door and the wire harness.

When the slide door D is slid to the rear side until it is in the half opened state, the state is obtained as shown in FIG. 6(B). FIGS. 8(A) to 8(C) show the state of the entire vehicle C at this time, the state of the power supply device 1A, and the relationship between the slide door D and the wire harness 2 as seen from the inside of the vehicle. Along with the sliding, the swing member 42 and the door side end portion 222 of the wire harness 2 swing and face downward, and the main body side end portion 221 of the wire harness 2 is rotated about the rotation axis along the longitudinal direction. In the half opened state, the swing member 42 and the door side end portion 222 face downward and the main body side end portion 221 turns 90 degrees counterclockwise from the fully closed state when seeing the door side unit 4 from the main body side unit 3. Further, as the main body side unit 3 and the door side unit 4 approach each other, the wire harness 2 tends to bend.

As the main body side end portion 221 rotates, the band plate portion 231 of the bending restricting member 23 is turned upward, and the bending restricting direction is turned upward. The wire harness 2 bends convexly downward on the slide door D side (the portion where the bending restricting member 23 is not provided) and at the vehicle body side (the portion where the bending restricting member 23 is provided), the wire harness 2 is bent convexly upward so as to be restricted from hanging downward. As a result, the wire harness 2 is bent convex downward on the side of the slide door D, and as shown in FIG. 6(B), the wire harness 2 is bent downward in the vehicle and extends linearly on the main body side. At this time, a part 2A of the wire harness 2 is positioned lower than when the slide door D is fully closed. Further, as shown in FIG. 8(C), the wire harness 2 extending downward from the door side unit 4 is turned toward the main body side unit 3 (inside the vehicle) so as to pass through the lower end of the door trim T of the slide door D.

It is to be noted that the part 2A is a part that becomes a vertex when the wire harness 2 is bent downward convexly and is located, for example, approximately at the center of the entire wire harness 2. In addition, the part 2A may be located nearer to the main body side end portion 221 than the center in the entire wiring harness 2, or may be positioned closer to the door side end portion 222.

Figure 9A:
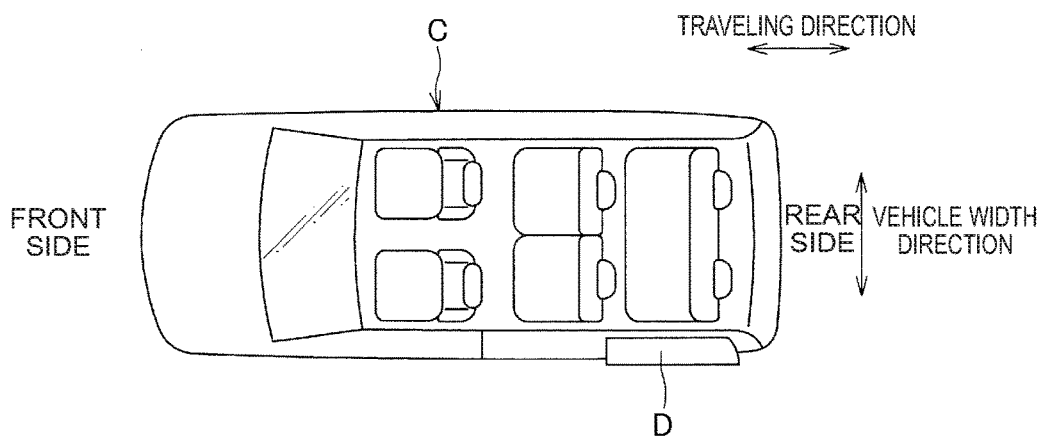
FIG. 9(A) is a plan view showing the state of the entire vehicle when the slide door is fully opened.
Figure 9B:
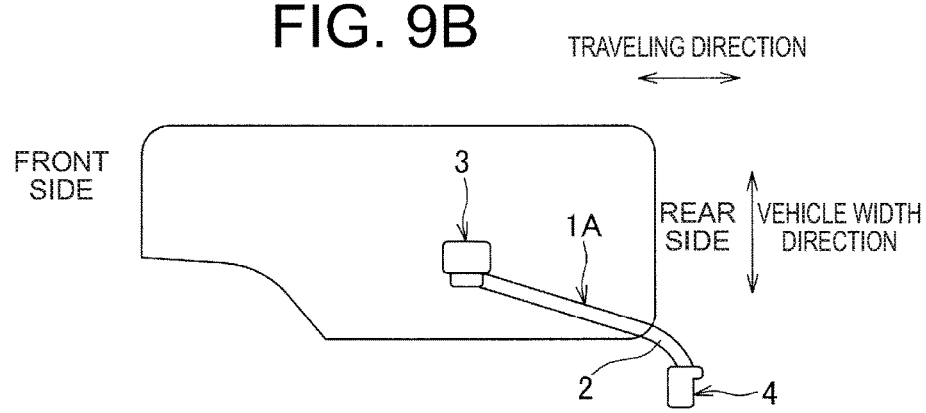
FIG. 9(B) is a plan view showing the state of the power supply device.
Figure 9C:
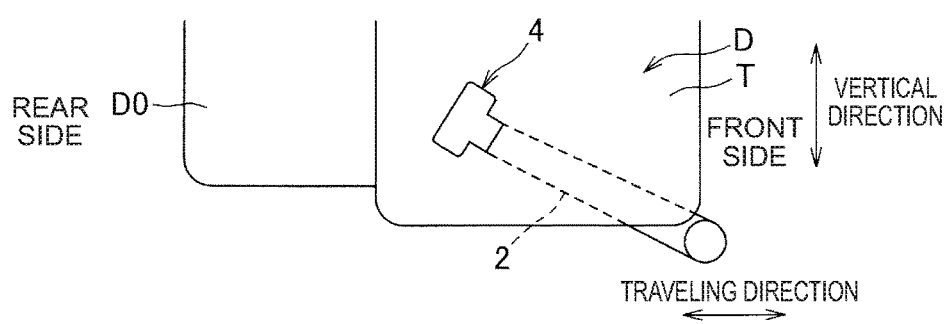
FIG. 9(C) is a side view showing a relationship between the slide door and the wire harness, as seen from the inside of the vehicle.

When the slide door D is slid to the rear side until it is fully opened, the state is obtained as shown in FIG. 6(C). FIGS. 9(A) to 9(C) show the state of the entire vehicle C, the state of the power supply device 1A, and the relationship between the slide door D and the wire harness 2 as seen from the inside of the vehicle at this time. Along with the sliding movement, the swing member 42 and the door side end portion 222 of the wire harness 2 swing to the rear side in the traveling direction, and the main body side end portion 221 of the wire harness 2 rotates about the rotation axis in the longitudinal direction. In the fully opened state, the swing member 42 and the door side end portion 222 face the rear side, and the main body side end portion 221 is rotated counterclockwise 90 degrees from the half opened state (180 degrees from the fully closed state) when seeing the door side unit 4 from the main body side unit 3.

As the main body side end portion 221 rotates in this way, the band plate portion 231 of the bending restricting member 23 is turned toward the vehicle interior side in the vehicle width direction. Further, the door side unit 4 moves away from the main body side unit 3, and the bending of the wire harness 2 gradually decreases. As a result, when the slide door is in the fully opened state, the wire harness 2 extends in the horizontal plane as shown in FIG. 6 (C) with the bending allowance direction facing the outside of the vehicle, and does not almost bend in the vertical direction. Therefore, the part 2A of the wire harness 2 is located above when the slide door D is fully opened compared to the case where the slide door D is in the half opened state. As shown in FIG. 9(C), the wire harness 2 extending from the door side unit 4 toward the front side is pulled out toward the main body side unit 3 so as to pass through the lower end of the door trim T of the slide door D.

The wire harness 2 extending from the door side unit 4 is drawn so as to pass through the lower end or the rear end of the door trim in accordance with the fully closed state, the half opened state, and the fully opened state of the slide door D, but a configuration where the wire harness 2 is pulled out from the door trim T is not limited to this. That is, it suffices that a drawing structure corresponds to the shape of the door trim T. For example, the wire harness 2 may always be pulled out from the slide door D so as to pass through the lower end of the door trim T.

In the half opened state, the swing member 42 may not turn the door side end portion 222 completely downward. That is, even when the door side end portion 222 is slightly inclined with respect to the vertical direction in the half opened state, the door side end portion 222 may be more inclined in the fully closed state rearward than in the half opened state and the door side end portion 222 may be more inclined toward the front side than in the half opened state.

As described above, when the slide door D is slid in the opening direction, the wire harness 2 bends not only in the horizontal plane but also in the space including the vertical direction (that is, three-dimensionally). In addition, when sliding the slide door D in the closing direction, each part of the power supply device 1A moves in a direction opposite to the case of sliding in the opening direction, and from the fully opened state shown in FIG. 6(A) and FIG. 9(A) via the half opened state shown in FIG. 6(B) and FIG. 8(A), the fully closed state is obtained shown in FIG. 6(C) and FIG. 7(A) to 7(C).

According to this embodiment as described above, there are the following effects. That is, the wire harness 2 is three-dimensionally bent, and the portion 2A of the wire harness 2 is moved downward in a half opened state of the slide door D, whereby the wire harness 2 is easily pulled out from the lower end of the door trim T, and the interfere between the wire harness 2 and the door trim T can be suppressed. Further, it is only necessary to bend the wire harness 2 appropriately three-dimensionally according to the shape of the door trim T or the like to suppress the interference, reducing the exposure of the wire harness in the slide door.

In addition, the door side end portion 222 of the wire harness 2 is swingably supported about the swing axis A1 along the vehicle width direction, so that when the slide door D is slid along the traveling direction, it is easy to bend the wire harness 2 three-dimensionally. That is, compared with a configuration in which the wire harness 2 is three-dimensionally bent without being swung, the wire harness 2 is hard to bend so as to have a small radius of curvature, so that damage to the wire harness 2 is suppressed, and it is possible to reduce resistance to sliding of the slide door D due to bending of the harness. In addition, as compared with a configuration in which the main body side end portion 221 is swung, the portion of the wire harness 2 on the slide door D side easily extends downward in the half opened state, and the wire harness 2 can be easily pulled out from the lower end of the door trim T.

In addition, since the main body side end portion 221 of the wire harness 2 is rotatably supported about the longitudinal direction, the wire harness 2 is less likely to be twisted, thereby suppressing damage when the wire harness 2 is three-dimensionally bent.

In addition, since the bending restricting member 23 has the bending allowance direction and the bending restriction direction, the wire harness can be easily bent three-dimensionally. Furthermore, since the bending restricting direction faces upward in the half opened state of the slide door D, so that the main body side end portion 221 supported to extend along the horizontal plane is regulated to bend so that damage to the wire harness 2 can be suppressed.

In addition, since the corrugated tube 22 is formed in a cylindrical shape, it is easy to manufacture it compared to a configuration using a corrugated tube having anisotropy for easy bending (for example, a corrugated tube having an elliptic cross section), thereby reducing the cost. Further, even if the corrugated tube 22 having isotropy is used for easy bending, providing the bending restricting member 23 as described above allows the wire harness 2 to be easily bent three-dimensionally.

[Second Embodiment]

Figure 10A:
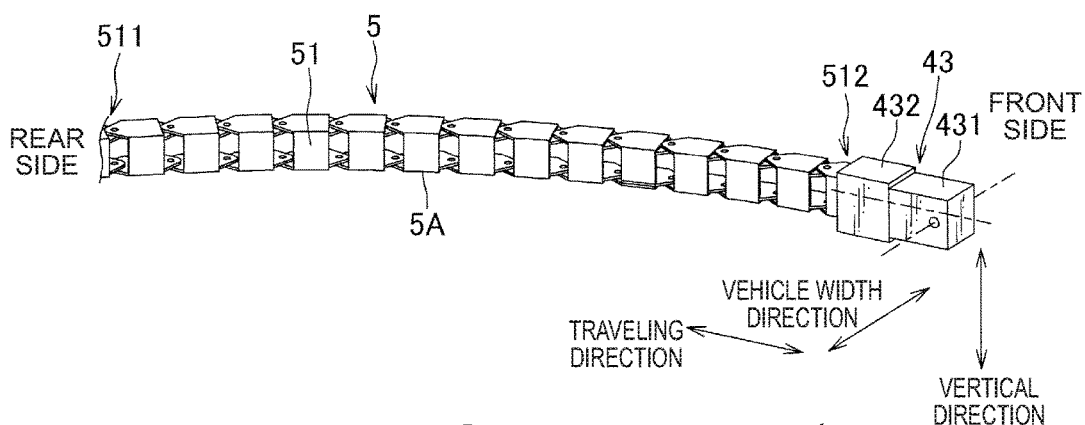
FIGS. 10(A) to 10(C) are perspective views showing a state of bending of a wire harness when the slide door slides in the vehicle provided with a power supply device according to a second embodiment of the present invention.
Figure 10B:
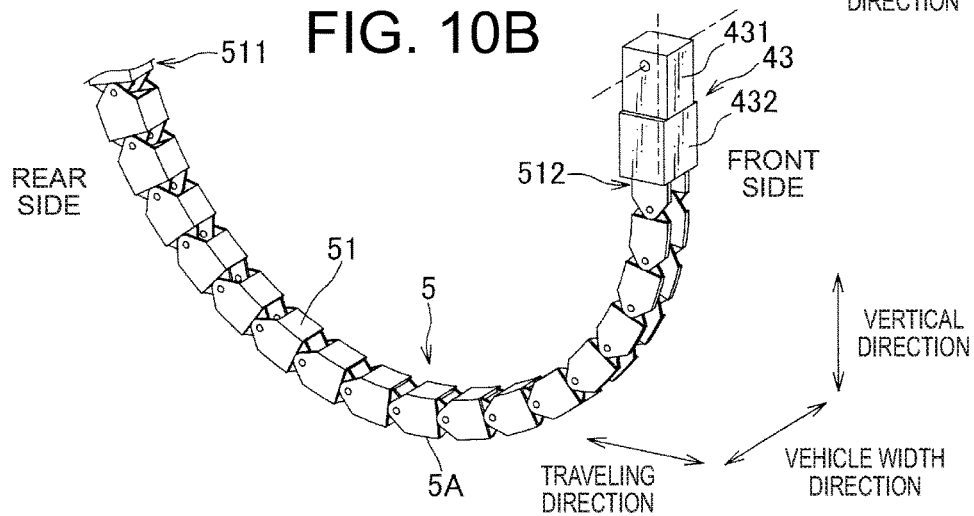
Figure 10C:
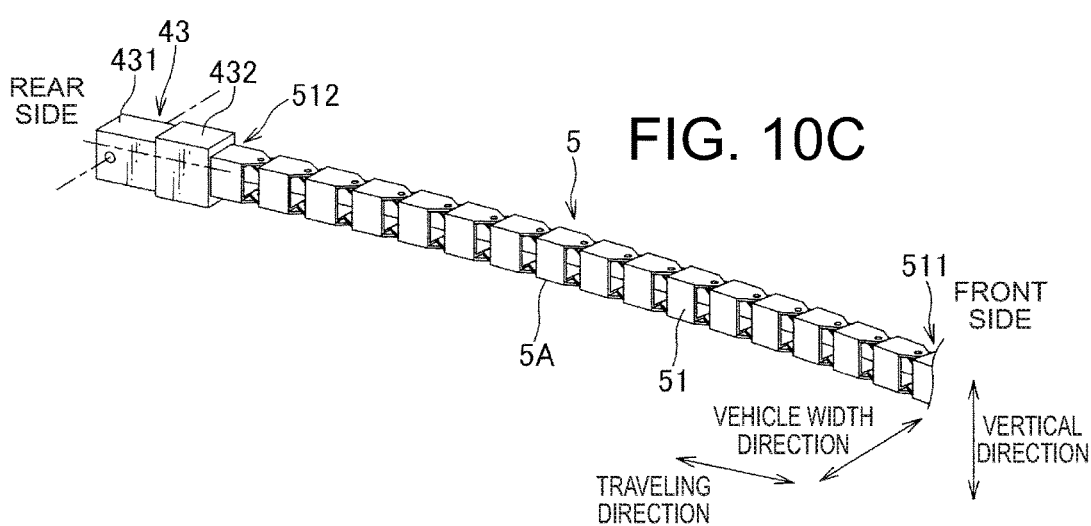

Hereinafter, a second embodiment of the present invention will be described with reference to the drawings. FIGS. 10(A) to 10(C) are perspective views showing how the wire harness 5 bends when the slide door slides in the vehicle provided with the power supply device according to the second embodiment of the present invention.

The power supply device of the present embodiment is provided with a wire harness 5 shown in FIGS. 10(A) to 10(C) in place of the wire harness 2 of the power supply device 1A of the first embodiment. The wire harness 5 has a plurality of electric wires (not shown) and a chain member 51 as an exterior member provided to cover the outer periphery of the electric wire.

A ball portion similar to the ball portion 33 of the first embodiment is fixed to the main body side end portion 511 of the chain member 51 and the main body side end portion 511 is rotatably supported about a rotation axis along the longitudinal direction of the wire harness 5 by the main body side support portion of the main body side unit. A swinging member 43 is fixed to the door side end portion 512 of the chain member 51.

The swing member 43 includes a supported portion 431 supported swingably about a swing axis along the width direction by a fixing portion 41 of the door side unit 4, and a harness fixing portion 432 fixed to the door side end portion 512. The supported portion 431 and the harness fixing portion 432 are configured to be able to rotate with each other about the rotation axis along the longitudinal direction of the wire harness 5. By fixing the door side end portion 512 to such a swing member 43, the door side end portion 512 can rotate about the rotation axis along the longitudinal direction of the wire harness, and is swingably supported about the swinging axis along the vehicle width direction.

In this way, since both ends 511 and 512 of the wire harness 5 are supported so as to be rotatable about the rotation axis along the longitudinal direction of the wire harness, the entire wire harness 5 is rotatable.

The chain member 51 is configured to be bendable on both sides in a predetermined direction as a plurality of frames are connected rotatablly to each other, and these two directions are set as bendable directions, and unbendable in both directions substantially orthogonal to the bendable direction, and these two directions are set as unbendable directions. In addition, the chain member 51 is difficult to bend in directions other than these directions.

The manner in which the wire harness 5 bends when the slide door slides will be described below with reference to FIGS. 10(A) to 10(C). Note that FIGS. 10(A) to 10(C) show the wire harness 5 with the electric wire that is omitted.

FIG. 10(A) shows the wire harness 5 when the slide door is fully closed. At this time, the door side end portion 512 of the wire harness 5 is oriented toward the rear side in the traveling direction. Further, the chain member 51 of the wire harness 5 turns two bendable directions in the vehicle width direction, and the unbendable direction in the vertical direction. Therefore, the wire harness 5 is allowed to bend convex toward the vehicle interior side or the vehicle exterior side, and is difficult to bend downward convexly due to its own weight. As a result, the wire harness 5 extends in the horizontal plane and hardly bends in the vertical direction.

When the slide door is slid to the rear side until it is in the half opened state, the state is obtained as shown in FIG. 10(B). With the sliding, the door side end portion 512 of the wire harness 5 swings and faces downward. Furthermore, as the main body side end portion 511 and the door side end portion 512 of the wire harness 5 each rotate about the rotation axis along the longitudinal direction, the entire wire harness 5 rotates. In the half opened state, the wire harness 5 has the door side end portion 512 oriented downward, and its entirety rotates counterclockwise by 90 degrees from the fully closed state when seeing the door side unit from the main body side unit.

As the whole wire harness 5 rotates in this manner, the two bendable directions of the chain member 51 approaches the vertical direction. Accordingly, the wire harness 5 gradually bends convexly toward one bendable direction. As a result, when the slide door is in the half opened state, the wire harness 5 is made in such a manner that the two bendable directions substantially coincide with the vertical direction and bends convex downward as shown in FIG. 10(B), and the portion 5A is positioned lower than when the slide door is fully closed.

When the slide door is slid to the rear side until the slide door is fully opened, the state is obtained as shown in FIG. 10(C). Along with sliding, the door side end portion 512 of the wire harness 5 swings and faces the rear side in the traveling direction. Furthermore, as the main body side end portion 511 and the door side end portion 512 of the wire harness 5 each rotate about the rotation axis along the longitudinal direction, the entire wire harness 5 rotates. In the fully opened state, the wiring harness 5 is brought in such a state that the door side end portion 512 is turned to the front side and its entirety is turned 90 degrees (180 degrees from the state) counterclockwise from the half opened state when seeing the door side unit from the main body side unit.

As the whole wire harness 5 rotates in this manner, the two bendable directions of the chain member 51 approaches the vehicle width direction. Accordingly, bending of the wire harness 5 gradually decreases. As a result, when the slide door is in the fully opened state, the two bending allowance directions and the vehicle width direction substantially coincides (that is, the unbendable direction is turned in the vertical direction), the wire harness 5 extends in the horizontal plane and hardly bends in the vertical direction. Therefore, the part 5 A of the wire harness 5 when the slide door is fully opened is located above compared with the case where the slide door is in the half opened state.

According to this embodiment as described above, in addition to the effects of the first embodiment, the following effects are obtained. That is, since the chain member 51 of the wire harness 5 has the bendable direction and the unbendable direction intersecting with it, the wire harness 5 can be easily bent convexly in a desired direction, and hardly bent convexly in the intersecting direction. In addition, as the entire wire harness 5 rotates along with sliding of the slide door, the orientation of the chain member 51 can be changed according to the state of the slide door, making it easier for the wire harness 5 to bend three-dimensionally.

It is to be noted that the present invention is not limited to the above-described embodiments, but includes other configurations and the like that can achieve the object of the present invention, and the following modifications and the like are also included in the present invention.

For example, in the first and second embodiments, the door side end portion of the wire harness is supported by the door side support portion so as to be capable of swinging about the swing axis along the vehicle width direction, but for example, as long as the wire harness has high flexibility and is easy to bend three-dimensionally, the configuration may be such that the door side end part does not swing.

Figure 11:
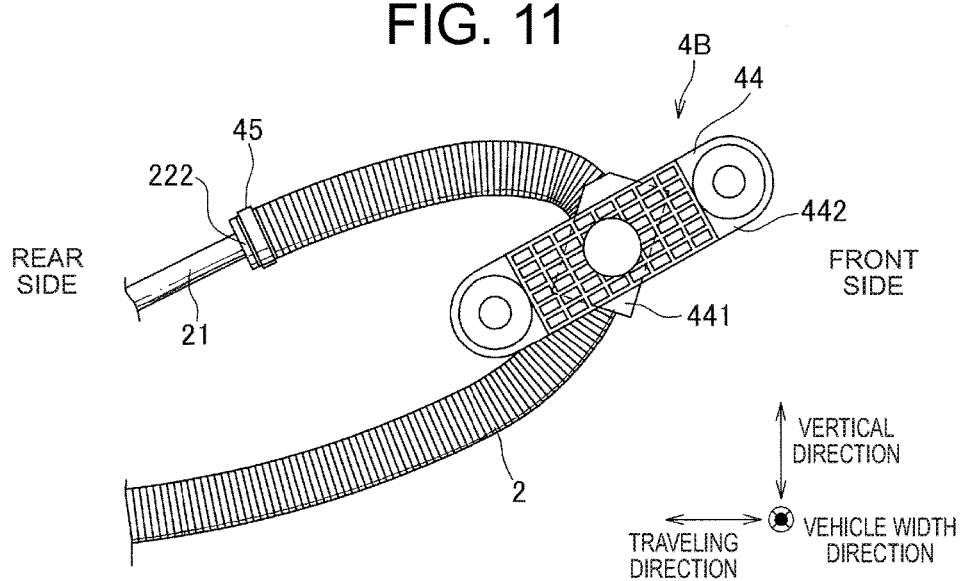
FIG. 11 is a front view showing a door side unit in a fully closed state in a power supply device according to a modification of the present invention.
Figure 12:
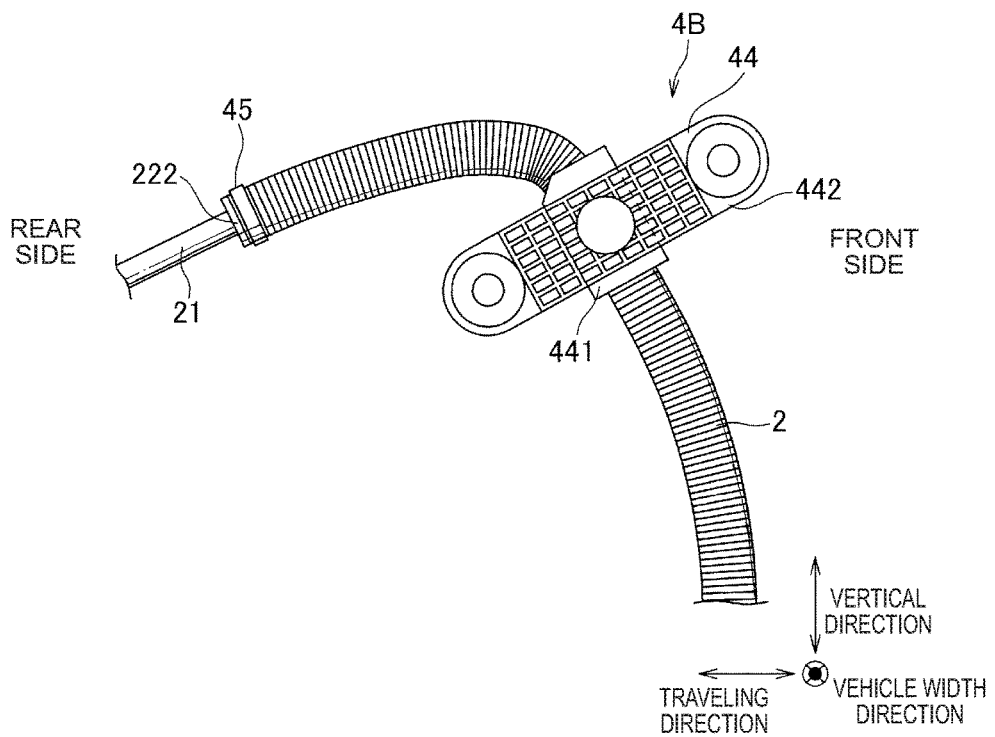
FIG. 12 is a front view showing a door side unit in a half opened state in a power supply device according to a modification of the present invention.
Figure 13:
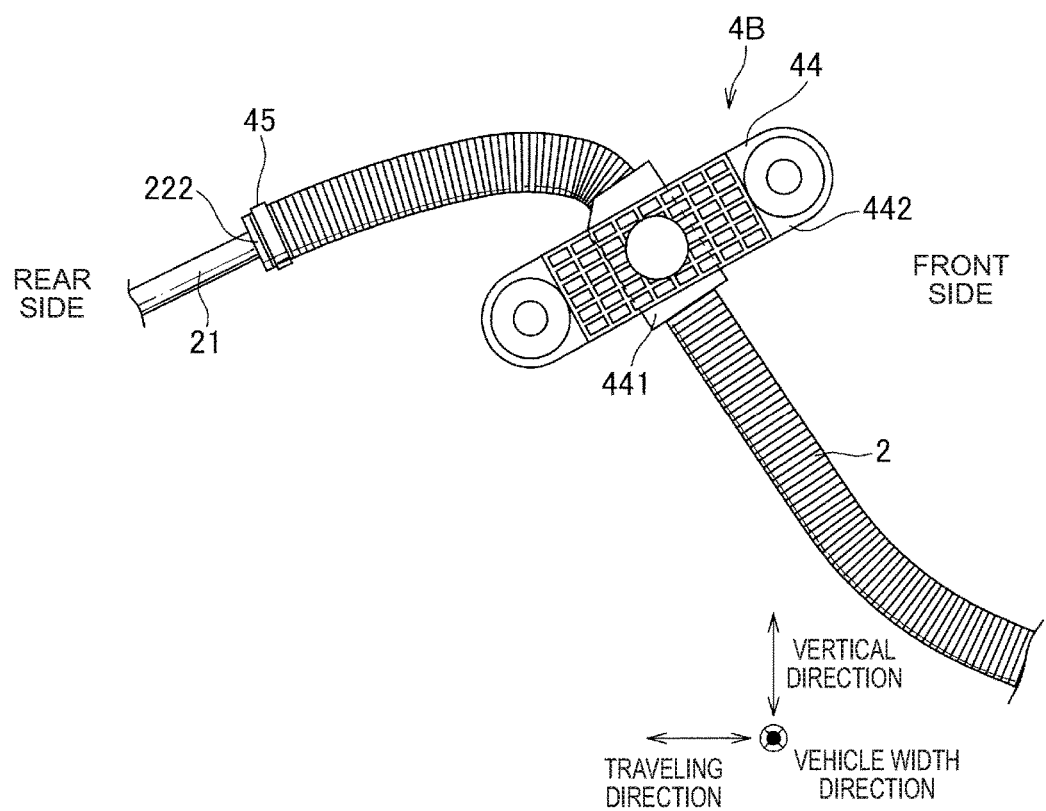
FIG. 13 is a front view showing a door side unit in a fully opened state in a power supply device according to a modification of the present invention.

Further, as shown in FIGS. 11 to 13, the door side unit 4B separately includes a swing supporting portion 44 for swingably supporting a position on the center side of the door side end portion 222 of the wire harness 2, and a door side support portion 45 that supports the door side end portion 222 of the wire harness 2. At this time, the swing supporting portion 44 and the door side supporting portion 45 are independently fixed to the slide door. Further, the electric wire 21 is pulled out from the door side end portion 222 supported by the door side supporting portion 45 and wired in the slide door. The door side support portion 45 has, for example, a winding portion wound about the outer periphery of the door side end portion 222 and a locking portion inserted and locked in a hole formed in the door panel, whereby the door side end portion 222 is fixed to the slide door.

The swing supporting portion 44 has a swinging member 441 through which the wire harness 2 is inserted and to which it is fixed, and a fixing portion 442 swingably supporting the swinging member 441 and fixed to the slide door, and swingably supports the wire harness 2 similarly to like the first embodiment. As the slide door slides, the swing member 441 swings, and the wire harness 2 bends as in the first embodiment. That is, when the slide door is in the fully closed state, as shown in FIG. 11, the wire harness 2 extends toward the rear side, and when in the half opened state, as shown in FIG. 12, the wire harness 2 extends slightly from the lower side toward the front side, and the wire harness 2 extends toward the front side when in the fully opened state.

According to such a configuration, since the swing supporting portion 44 is formed separately from the door side supporting portion 45, as compared with such a configuration as in the first embodiment in which these are integrated, the structure of the swing supporting portion 44 can be simplified and the number of parts can be reduced. That is, though the structure of the door side end portion 222 tends to be complicated since the electric wire 21 is pulled out from the end portion of the wire harness 2, the support of the door side end portion 222 and the support for swing are different from each other, thereby simplifying the structure.

In the first embodiment, the bending restricting member 23 is provided on the side of the vehicle body of the wire harness 2, but the case where the body side end 221 of the wire harness 2 is not supported to extend in the horizontal direction, or in the case where it is difficult to bend convex upward, the bending restricting member may not be provided. Further, as in the second embodiment, the bending restricting member may be further provided for the wire harness having the chain member.

In the first embodiment, the main body side end portion 221 of the wire harness 2 is supported by the main body side support portion so as to be rotatable about the rotation axis along the longitudinal direction of the wire harness, but in the case where the wire harness can be three-dimensionally bent without rotating, and the wire harness has high strength against torsion, such a configuration is preferable that the body side end portion of the wire harness does not rotate.

Further, in the first embodiment, the wire harness 2 has the cylindrical corrugated tube 22, but a corrugated tube having another shape may be used. For example, if an elliptical corrugated tube is used, easiness of bending varies depending on the direction to be bent, and the corrugated tube can have a function of regulating bending.

Further, in the first embodiment, the bending restricting member 23 has one bending allowance direction and one bending restraining direction, and in the second embodiment, the chain member 51 has two bendable directions and two unbendable directions. However, the bending restricting member and the chain member may have an appropriate number of bending allowance directions or bendable directions.

Further, in the first and second embodiments, the wire harness is not bent almost convexly downward in the fully closed state and the fully opened state. However, in the half opened state, at least the part of the wire harness may be positioned downward more than in a fully closed state and in a fully opened state, or the wire harness may be positioned downward more than in a fully closed state and in a fully opened state.

Although the best configurations, methods, and the like for carrying out the present invention are disclosed in the above description, the present invention is not limited thereto. While the invention has been particularly shown and described with particular reference to certain embodiments thereof, varying in material, quantity, and other detailed configurations will be apparent to those skilled in the art without departing from the spirit and scope of the invention. Accordingly, the description that limits the shape, material, and the like disclosed above is illustratively described in order to facilitate the understanding of the present invention, and does not limit the present invention, so the description using the part is included in the present invention with a part of the limitation or all limitations such as shape and material removed.

[Second Invention]

The present invention relates to a power supply device for supplying power from a vehicle body to the slide door in a vehicle having a slide door.

Generally, a vehicle equipped with a slide door is provided with a power supply device for supplying power from the vehicle body to the slide door. That is, a battery etc. mounted on the vehicle body and an electrical component provided on the slide door are electrically connected to each other so that electric power is supplied by the wire harness of the power supply device. The wire harness of such a power supply device is formed such that the electric wire is covered with an exterior member such as a corrugated tube and is supported swingably on the slide door side. Also, the electric wire is drawn from the exterior member in the slide door, exposed, and wired.

The electric wire exposed on the slide door side may interfere with other members at the time of sliding of the slide door or during manufacture (for example, at the time of wiring) and may receive a mechanical shock and be damaged. In view of this, there has been proposed a power supply device in which a protector is provided at a position where a wire is pulled out from a corrugated tube in a wire harness (for example, see Japanese Patent Laid-Open No. 2008-312374). In the power supply device described in the above document, the electric wire is protected from a mechanical impact by a protector.

Such a protector can also have a function of suppressing intrusion of foreign matter into the corrugated tube. That is, as the end portion of the corrugated tube is open, and there is a possibility that foreign matter such as water and dust may intrude through this opening, covering the end portion of the corrugated tube with the protector can suppress intrusion of foreign matter. Therefore, the protector can protect the electric wire not only from a mechanical impact but also from a foreign matter entering into the corrugated tube.

However, provision of such a protector has a disadvantage that the size of the power supply device increased on the slide door side. That is, it was difficult to achieve both protection of the electric wire and miniaturization of the entire device.

An object of the present invention is to provide a power supply device that can downsize the entire device while protecting the wire of the wire harness.

In order to solve the above problem and achieve the object, the invention (1) is a power supply device for supplying power from a vehicle main body to a slide door in a vehicle having the slide door sliding along a traveling direction, including a wire harness provided from the vehicle main body to the slide door, a main body side unit for supporting the wire harness on the side of the vehicle main body, a door side unit for supporting the wire harness on the side of the slide door, the wire harness includes one or more electric wires for supplying electric power from the vehicle main body to the slide door and a tubular exterior member covering the outer periphery of the electric wire, and the door side unit includes a swing supporting portion that swingably supports the exterior member at a position away from an end portion on the side of the slide door, and a fixing portion for fixing the wire harness directly or indirectly to the slide door on the side of the slide door nearer than the sewing supporting member.

The invention (2) is characterized in that in the invention (1), the swing support portion swingably supports the exterior member about a swing axis extending along a vehicle width direction.

The invention (3) is characterized in that in the invention (1) or (2), the fixing portion fixes the wire harness such that an end portion on the slide door side of the exterior member is oriented in the horizontal direction or downward.

The invention (4) is characterized in that, in any one of inventions (1) to (3), the exterior member is a corrugated tube formed at least partly in a bellows shape in the longitudinal direction.

According to the invention (1), since the swing supporting portion supports the exterior member at a position away from the end portion on the slide door side, the electric wire is covered with the exterior member positioned closer to the slide door than the position supported swingably. Thereby, on the slide door side, the exterior member can protect the electric wire from a mechanical impact. Furthermore, by fixing the wire harness to the slide door on the side of the slide door with respect to the swing supporting portion by the fixing portion, the end portion of the exterior member can be set in such a direction that foreign matter hardly intrudes by appropriately setting a position of the fixing portion with respect to the swing supporting portion. Thereby, it is possible to protect the electric wire from foreign matter entering the exterior member on the slide door side.

Further, even without providing a protector for covering the electric wire, the electric wire can be protected as described above. At this time, since only the fixing portion for supporting the wire harness is provided in addition to the position of swing support, the whole device can be downsized as compared with the structure provided with the protector.

According to the invention (2), since the exterior member is swingably supported about the swing axis along the vehicle width direction, the wire harness can be bent not only in the horizontal direction but also in the vertical direction, between the main body side unit and the door side unit when the slide door is slid, so that the wire harness can be deformed in an appropriate manner.

According to the invention (3), since the end portion of the exterior member on the side of the slide door is oriented horizontally or downwardly, foreign matter such as water and dust falling from above the wire harness hardly invades the exterior member.

According to the invention (4), since the exterior member is a corrugated tube formed at least partly in a bellows shape in the longitudinal direction, the wire harness can be easily bent when the slide door is slid.

Figure 14:
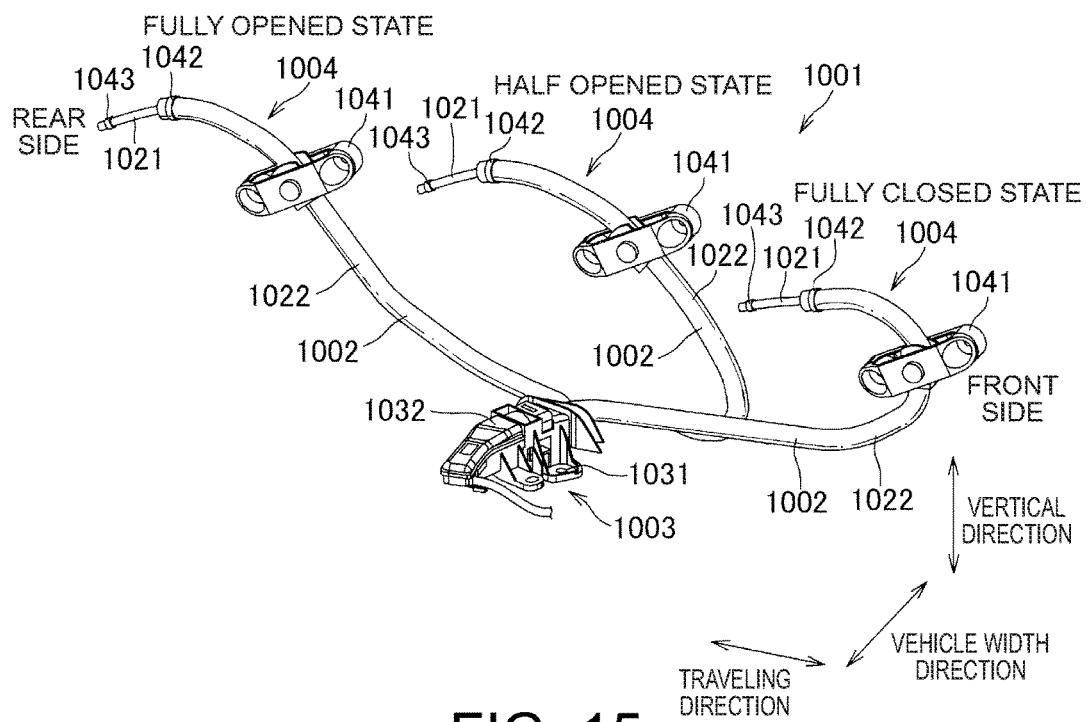
FIG. 14 is a perspective view showing a power supply device according to an embodiment of a second invention.
Figure 16:
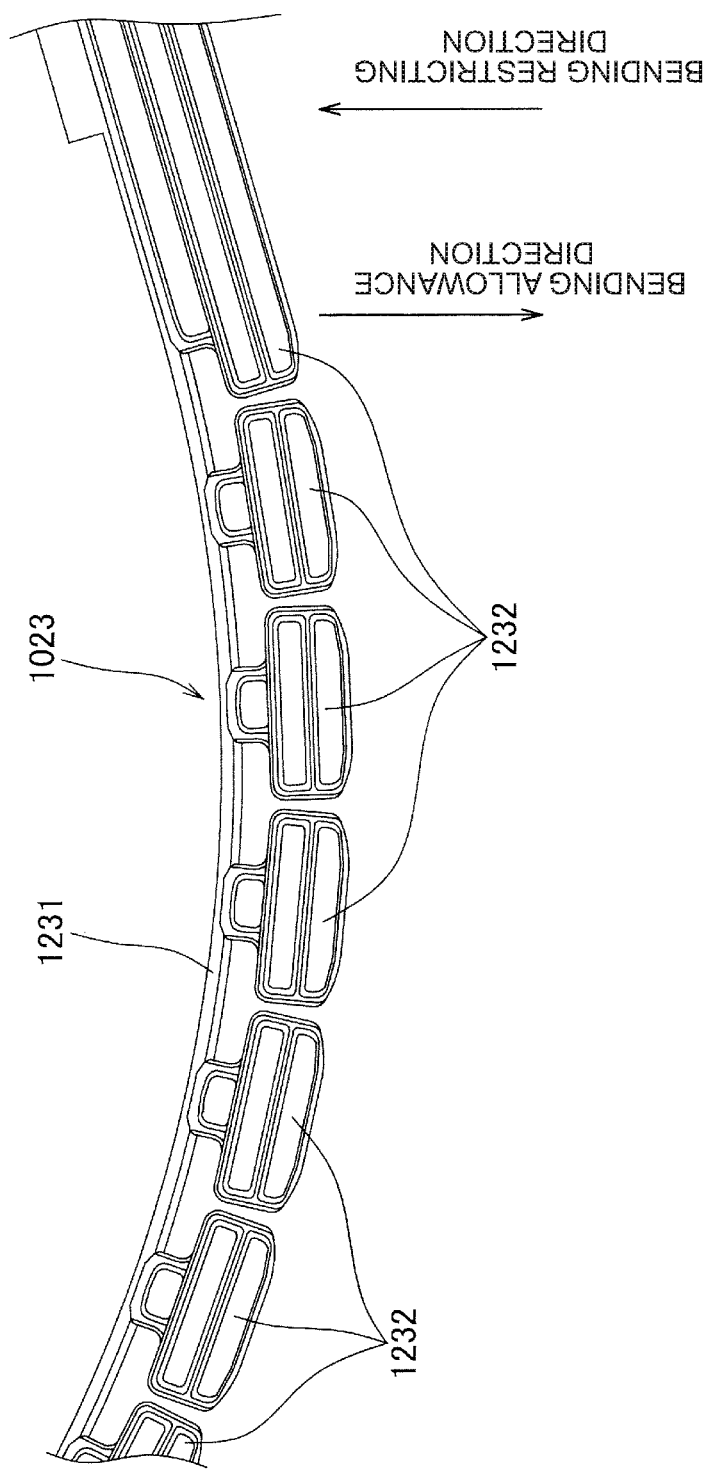
FIG. 16 is a side view showing a bending restricting member provided in the wire harness of the power supply device.
Figure 17:
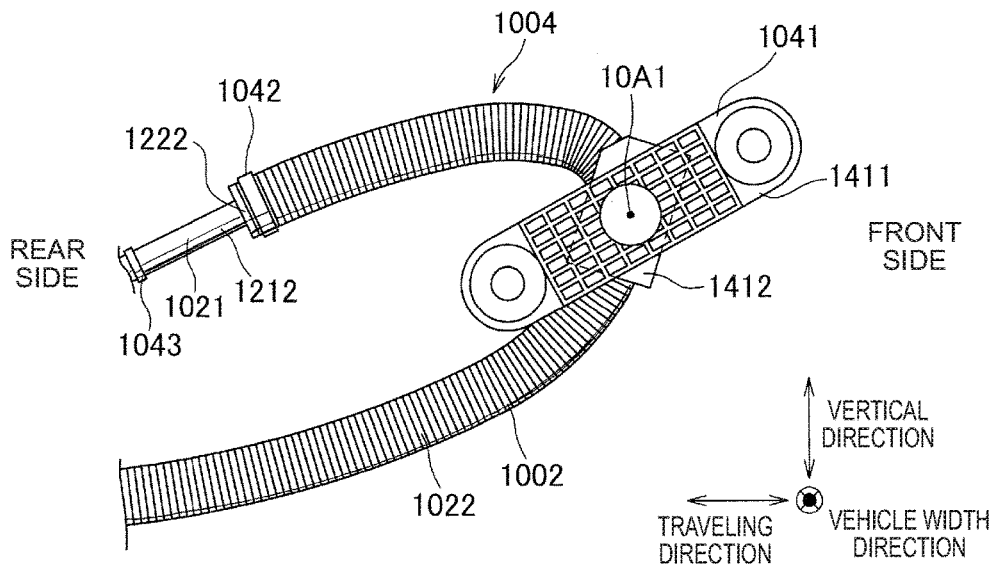
FIG. 17 is a side view showing a door side unit of the power supply device when the slide door is fully closed.
Figure 18:
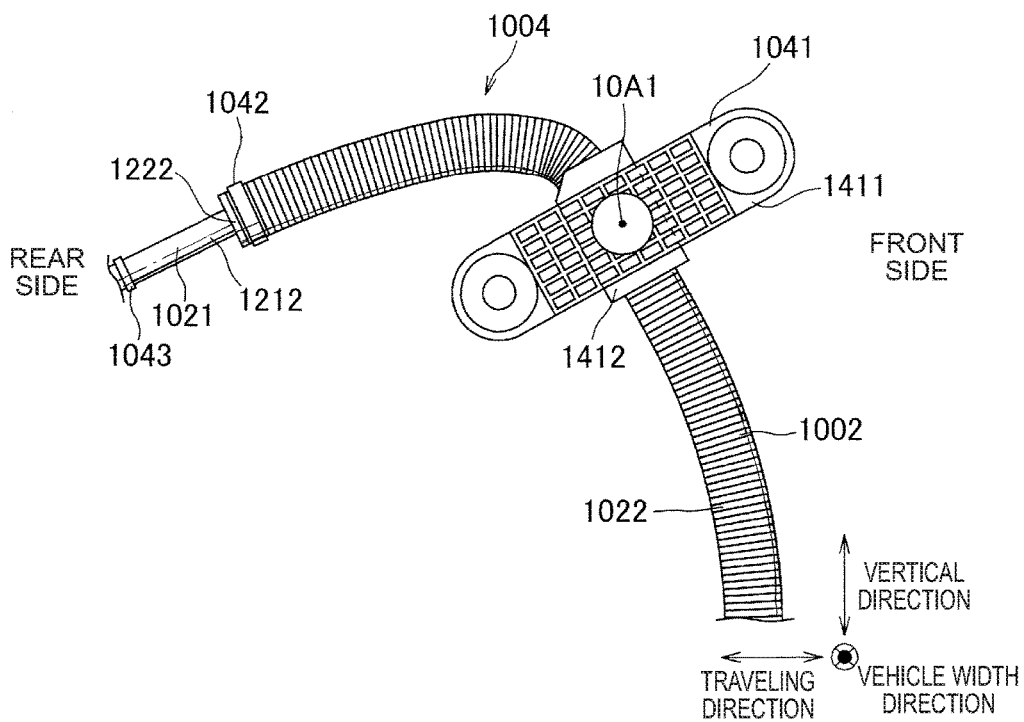
FIG. 18 is a side view showing the door side unit when the slide door is in a half opened state.
Figure 19:
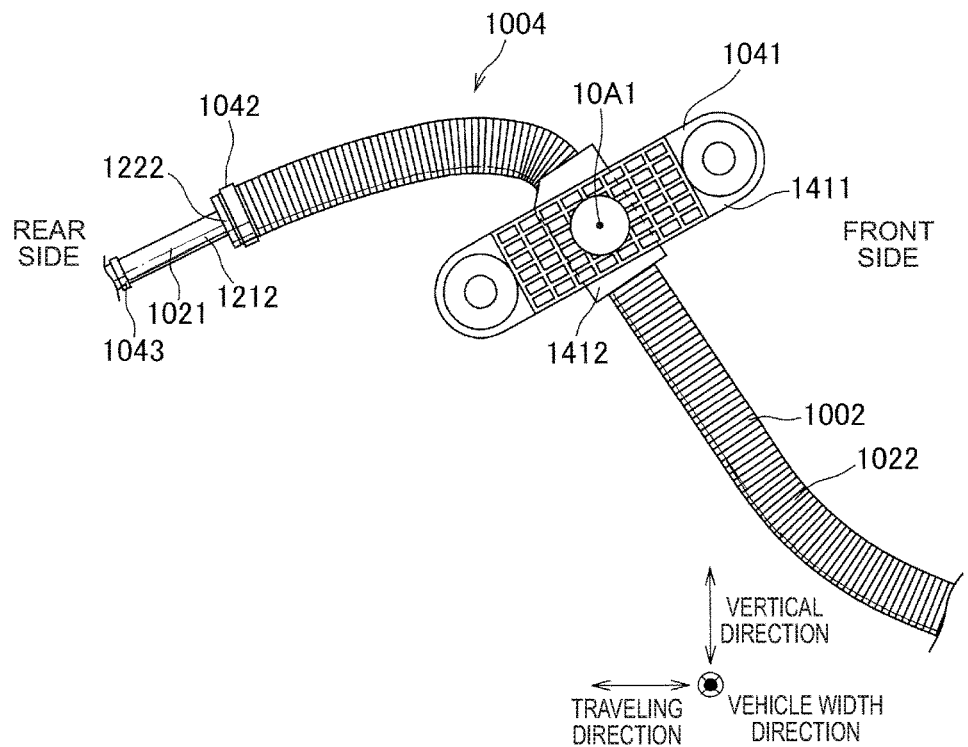
FIG. 19 is a side view showing the door side unit when the slide door is fully opened.
Figure 20:
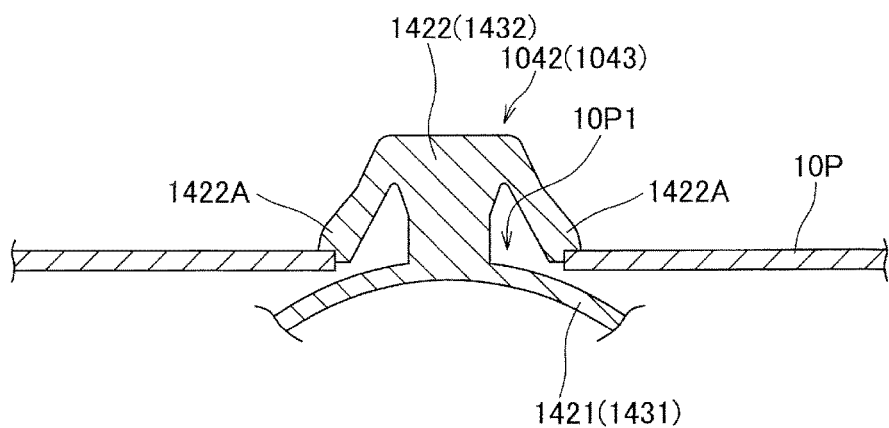
FIG. 20 is a cross-sectional view showing a fixing portion of the door side unit.
Figure 22A:
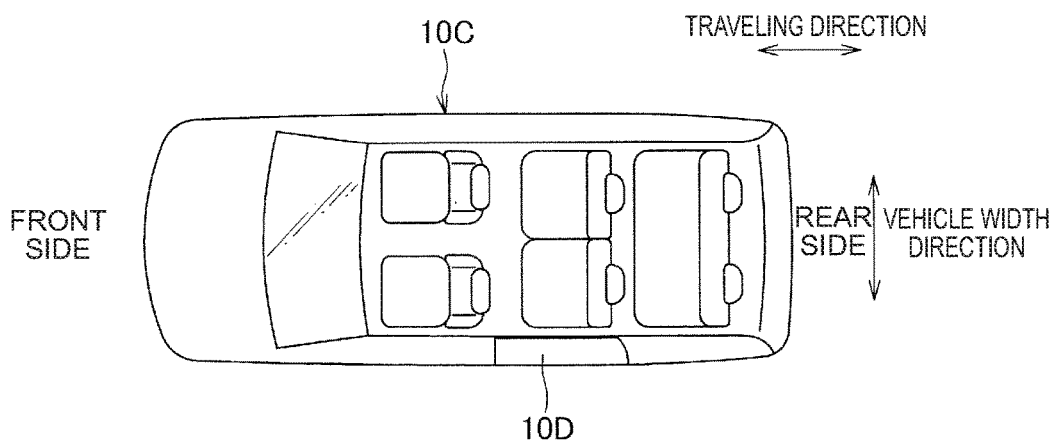
FIG. 22(A) is a plan view showing the state of the entire vehicle when the slide door is fully closed.
Figure 22B:
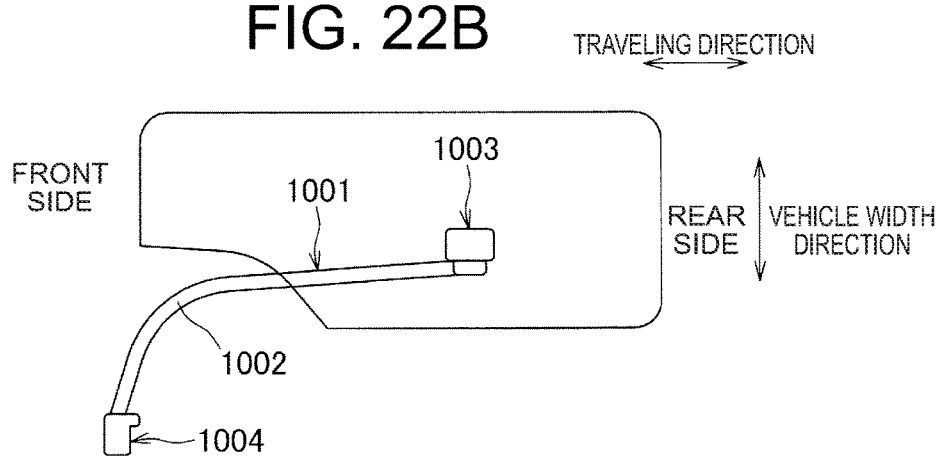
FIG. 22(B) is a plan view showing a state of the power supply device.
Figure 22C:
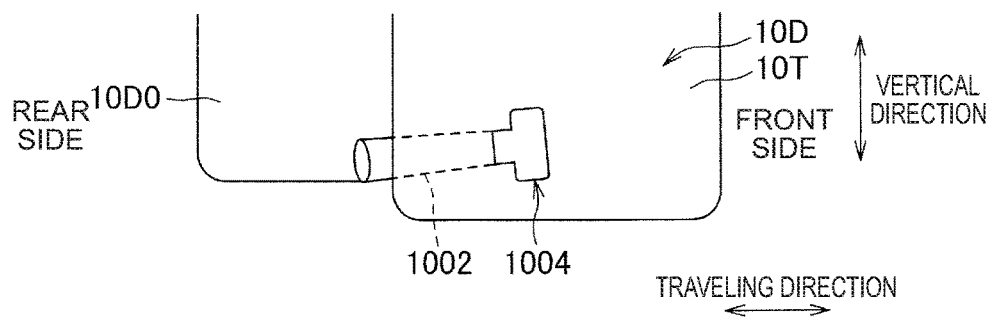
FIG. 22(C) is a side view showing the relationship between the slide door and the wire harness, as seen from the inside of the vehicle.
Figure 23A:
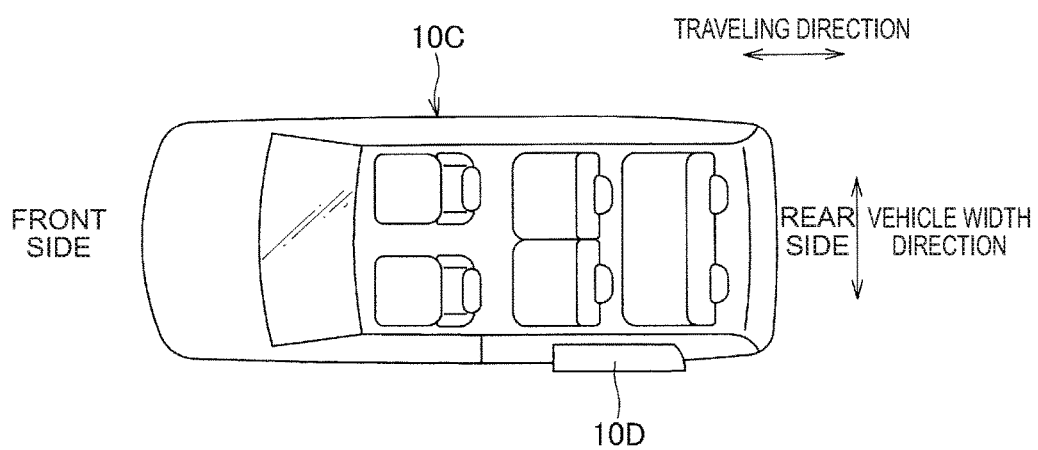
FIG. 23(A) is a plan view showing the state of the entire vehicle when the slide door is in a half opened state.
Figure 23B:
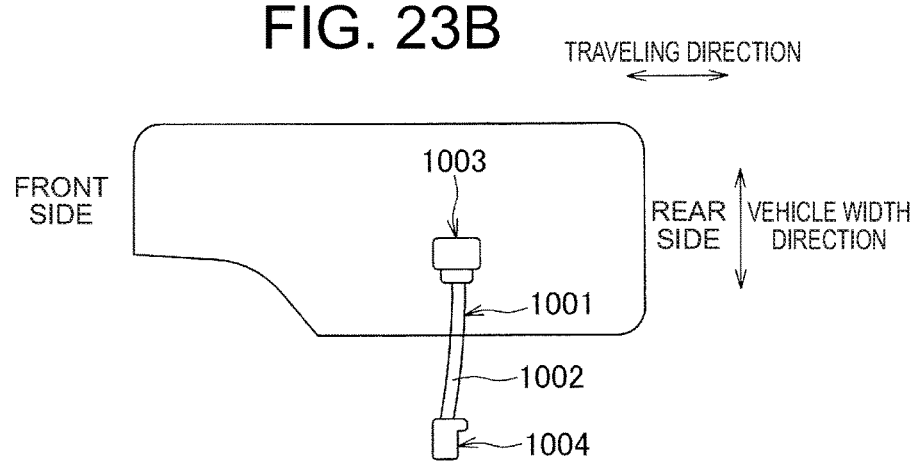
FIG. 23(B) is a plan view showing the state of the power supply device.
Figure 23C:
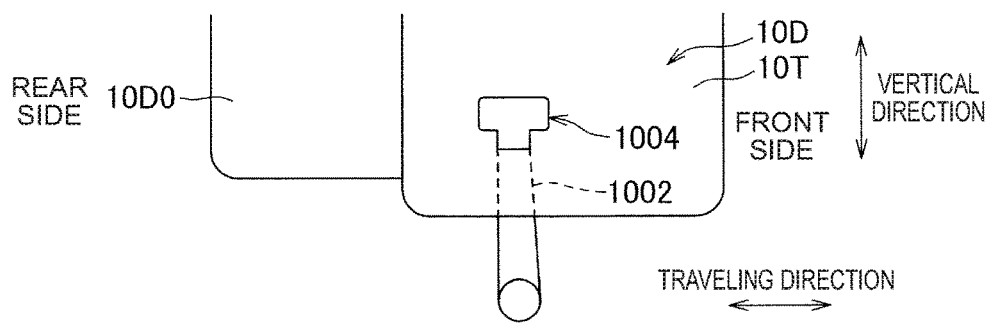
FIG. 23(C) is a side view showing a relationship between the slide door and the wire harness, seen from the inside of the vehicle.
Figure 24A:
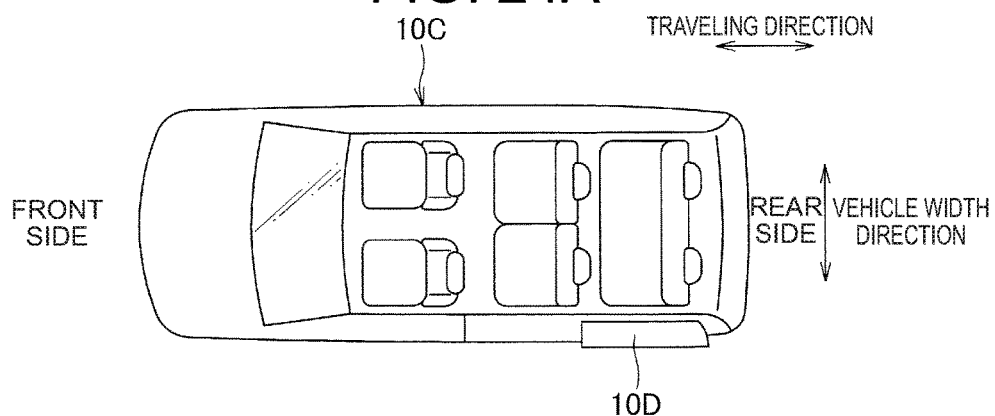
FIG. 24(A) is a plan view showing the state of the entire vehicle when the slide door is fully opened.
Figure 24B:
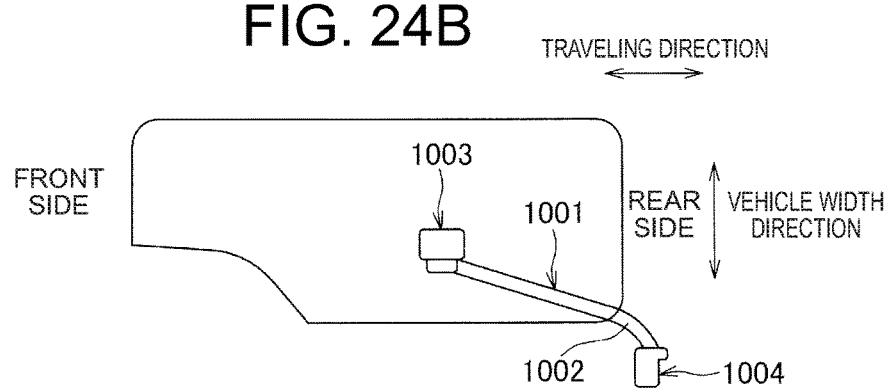
FIG. 24(B) is a plan view showing the state of the power supply device.
Figure 24C:
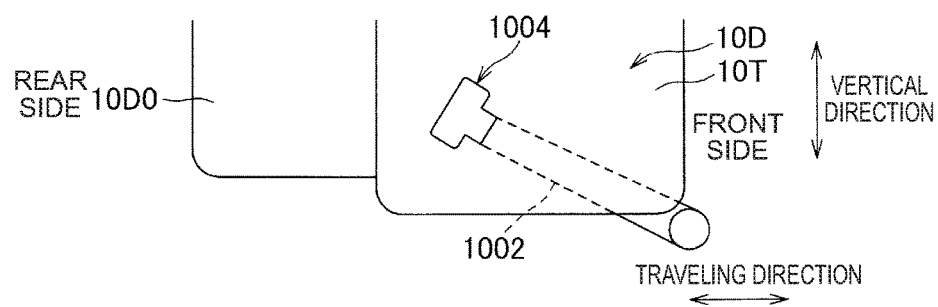
FIG. 24(C) is a view showing a relationship between the slide door and the wire harness, seen from the inside of the vehicle.

Embodiments of the present invention will be described below with reference to the drawings. FIG. 14 is a perspective view showing the power supply device 1001 according to the embodiment of the present invention, FIG. 15 is a perspective view showing a main part of the main body side unit 1003 of the power supply device 1001, FIG. 16 is a side view showing a bending restricting member 1023 provided in the wire harness 1002 of the power supply device 1001, FIG. 17 is a side view showing a door side unit 1004 of the power supply device 1001 when the slide door is fully closed, FIG. 18 is a side view showing the door side unit 1004 when the slide door is in a half opened state, FIG. 19 is a side view showing the door side unit 1004 when the slide door is fully opened, FIGS. 20 is a cross-sectional view showing fixing portions 1042, 1043 of the door side unit 1004, FIG. 21(A) to 21(C) are perspective views showing how the wire harness 1002 is bent when the slide door slides in the vehicle provided with the power supply device 1001, FIG. 22(A) is a plan view showing the state of the entire vehicle when the slide door is fully closed, FIG. 22(B) is a plan view showing a state of the power supply device 1001, FIG. 22(C) is a side view showing the relationship between the slide door and the wire harness 1002, seen from the inside of the vehicle, FIG. 23(A) is a plan view showing the state of the entire vehicle when the slide door is in a half opened state, FIG. 23(B) is a plan view showing the state of the power supply device, FIG. 23(C) is a side view showing a relationship between the slide door and the wire harness 1002, seen from the inside of the vehicle, FIG. 24(A) is a plan view showing the state of the entire vehicle when the slide door is fully opened, FIG. 24(B) is a plan view showing the state of the power supply device 1001, and FIG. 24(C) is a view showing a relationship between the slide door and the wire harness 1002, seen from the inside of the vehicle.

The power supply device 1001 of the present embodiment is provided in a vehicle having a slide door sliding along the traveling direction and is for supplying power from the vehicle body to the slide door, and includes, as shown in FIG. 14, a wire harness 1002, a main body side unit 1003, and a door side unit 1004. FIG. 14 shows the state of the power supply device 1001 in the fully closed state, the partially opened state, and the fully opened state of the slide door. The slide door is provided on the side surface of the vehicle and slidably opens toward the rear side in the traveling direction and also moves somewhat in the vehicle width direction at the time of sliding so as not to interfere with the vehicle body.

Further, in this embodiment, while the half opened state of the slide door means a state in which the slide door is positioned at substantially the center position out of the entire movable range, a state in which the door side unit 1004 is closest to the main body side unit 1003 so that the state the wire harness 1002 is most bent may be set to the half opened state of the slide door, and an appropriate state between the fully opened state and the fully closed state may be set to the half opened state.

Figure 15:
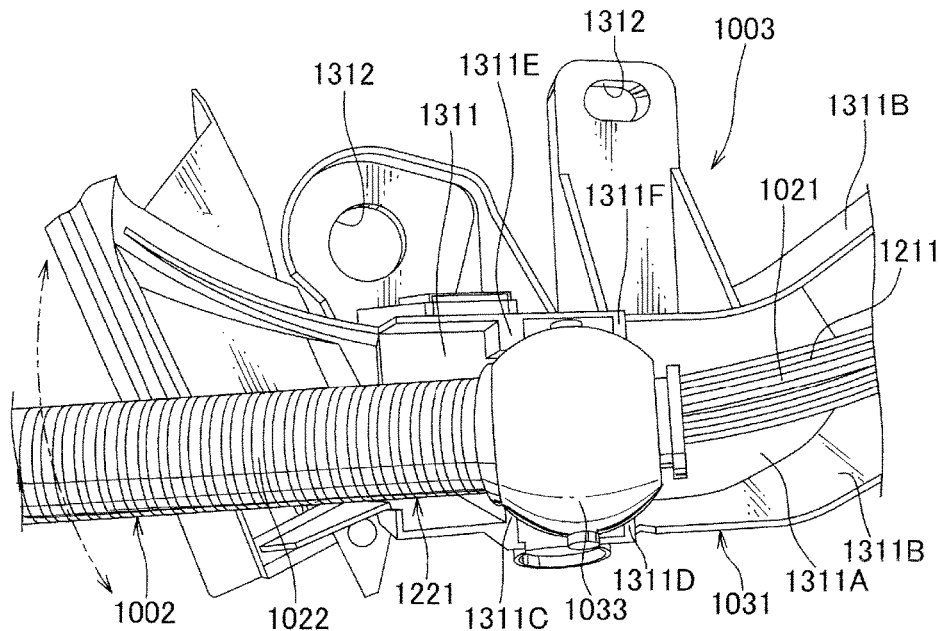
FIG. 15 is a perspective view showing a main part of the main body side unit of the power supply device.
Figure 21A:
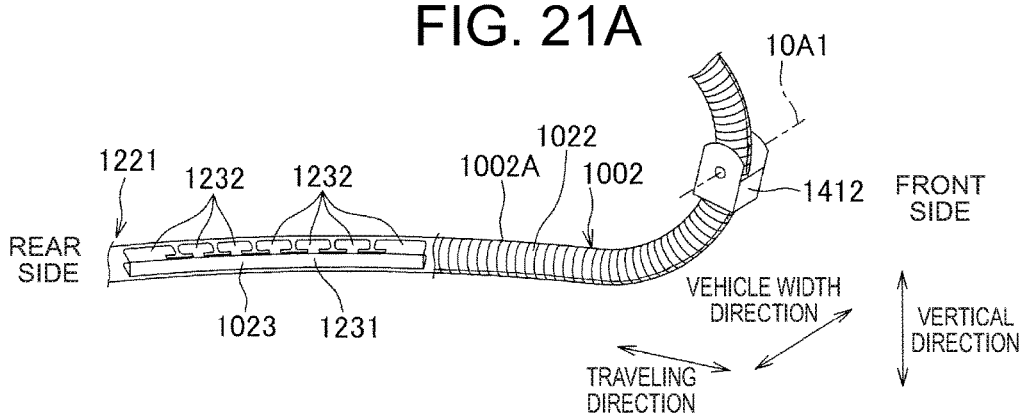
FIGS. 21(A) to 21(C) are perspective views showing how the wire harness is bent when the slide door slides in the vehicle provided with the power supply device.
Figure 21B:
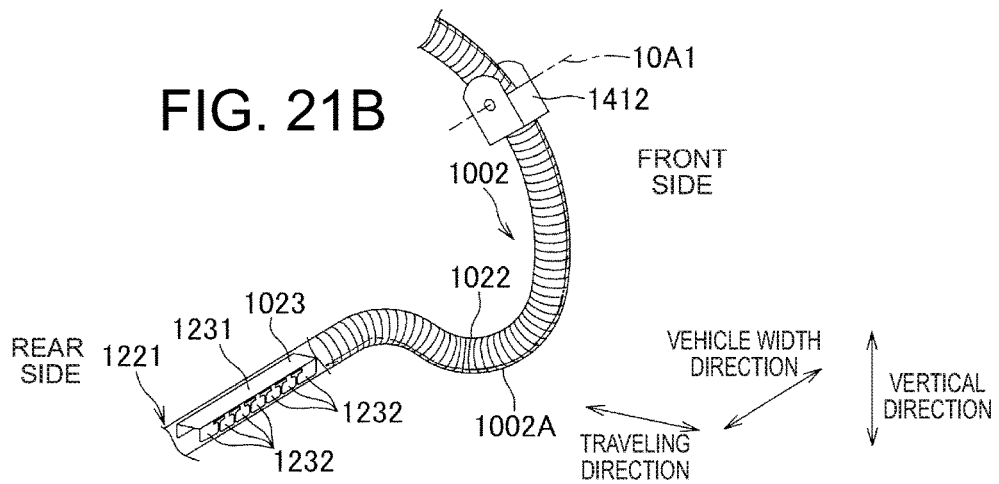
Figure 21C:
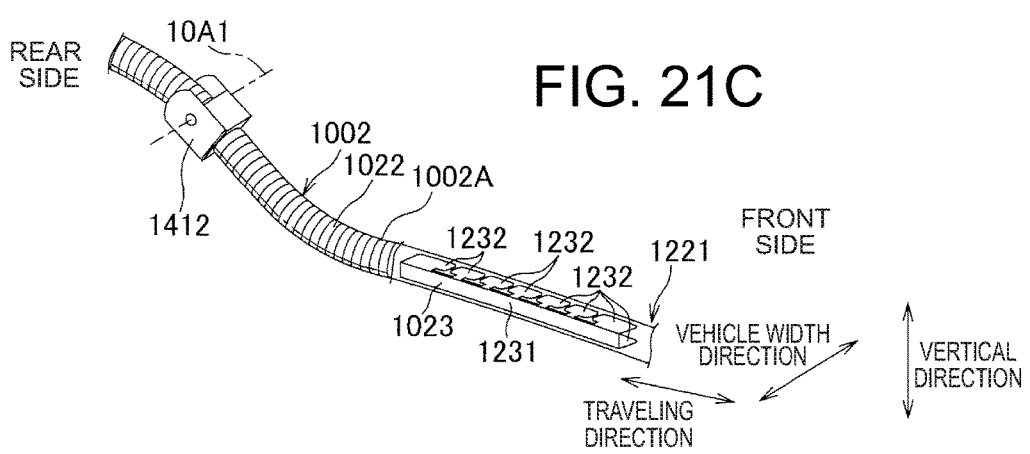

As shown in FIGS. 15 and 21, the wire harness 1002 is provided across the vehicle main body to the slide door, and as shown in FIGS. 15, 21(A) to 21(C), includes a plurality of electric wires 1021, a corrugated tube 1022 as an exterior member for covering the outer periphery of the electric wire 1021, and a bending restricting member 1023 provided on the vehicle body side. In FIGS. 21(A) to 21(C), the electric wire 1021 is omitted for convenience of explanation. In addition, when the wire harness 1002 rotates about the rotation axis along its longitudinal direction as will be described later, it is assumed that the corrugated tube 1022 rotates. At this time, the bending restricting member 1023 rotates together with the corrugated tube 1022, and the electric wire 1021 may or may not rotate.

The electric wire 1021 is electrically connected to a battery mounted on the vehicle body and is electrically connected to an electrical component (such as a speaker or a power window) provided on the slide door, and supplies electric power from the battery to the electrical component. Incidentally, the electric wire 1021 is formed longer than the corrugated tube 1022, and both ends thereof are drawn out from the corrugated tube 1022 and are exposed. A portion of the electric wire 1021 exposed on the main body side is defined as a main body side exposed portion 1211, and a portion exposed on the slide door side is defined as a door side exposed portion 1212.

The corrugated tube 1022 is formed in a cylindrical shape with, for example, a synthetic resin, and the main body side end portion 1221 is connected to a ball portion 1033 described later. The entire corrugated tube 1022 in the longitudinal direction may be formed in a bellows shape, or a part thereof may be formed in a bellows shape. Instead of the corrugated tube, a tubular member having appropriate flexibility may be used as the exterior member.

The bending restricting member 1023 is formed of a member having suitable elasticity (for example, synthetic resin or the like), and as shown in FIG. 16, includes a band plate portion 1231 and a plurality of restricting portions 1232 erected substantially vertically from both ends in the width direction of the band plate portion 1231. In addition, the bending restricting member 1023 is provided inside the corrugated tube 1022 together with the electric wire 1021, surrounds the electric wire 1021 with the band plate portion 1231 and the restricting portion 1232, and extends along the electric wire 1021.

The band plate portion 1231 is flexurally deformed by an external force in the plane perpendicular direction and hardly deformed by an external force in the in-plane direction. In addition, the plurality of restricting portions 1232 is formed in a T shape and a plate shape, adjacent ones thereof are in contact with each other when the band plate portion 1231 becomes a flat plate shape, and the restricting portions are separated when the band plate portion 1231 is bent and deformed toward one side of the plane perpendicular direction (toward the restricting portion 1232 side). That is, the plurality of restricting portions 1232 allows the band plate portion 1231 to flex and deform in a convex shape toward one side in the plane perpendicular direction, and to restrict flexural deformation toward the other side.

Therefore, in the bending restricting member 1023, the direction toward one side in the plate perpendicular direction of the band plate portion 1231 is set as the bending allowance direction allowing the bending of the wire harness 1002, and the direction toward the opposite side (the other side) bending restricting direction restricting the bending of the harness 1002. It is to be noted that the wire harness 1002 is not excessively bent due to the elasticity of the band plate portion 1231 also in the bending allowance direction. In addition, the bending restricting member 1023 is hardly bent or twisted in other directions, and the wire harness 1002 hardly bends.

By providing such a bending restricting member 1023, bending of the wire harness 1002 is restricted as described later. Further, the bending restricting member 1023 has such a length as to be provided over a predetermined range with respect to the entire corrugated tube 1022.

Although the wire harness 1002 is provided between the main body side unit 1003 and the door side unit 1004, the "main body side" or "slide door side" related to the wire harness 1002 may be one with reference to not the vehicle width direction but its longitudinal direction. For example, in the portion of the wire harness 1002 which is arranged along the slide door, the position in the vehicle width direction is substantially constant. The position further away from the main body side unit 1003 in the longitudinal direction is set to "slide door side".

As shown in FIGS. 14 and 15, the main body side unit 1003 includes a base portion 1031 fixed to the vehicle body, a lid portion 1032 assembled to the base portion 1031, and a spherical ball portion 1033 fixed to the main body side end portion 1221 of the wire harness 1002, and provided, for example, in the vicinity of a side sill.

The base portion 1031 is formed of synthetic resin, for example, and includes a guide portion 1311 and a fixing hole 1312 formed outside the guide portion 1311 and to which a fixing member for fixing to the vehicle body is inserted. The guide portion 1311 has a bottom surface portion 1311A and a pair of upstanding walls 1311B standing from the bottom surface portion 1311A and opens upward. The lid portion 1032 is assembled to the base portion 1031 so as to cover the opening, so that a tubular portion is formed. The wire harness 1002 is arranged and guided in the cylindrical portion.

A total of four supporting protrusions 1311C to 1311F protruding so as to approach each other are formed in the pair of standing walls 1311B, and two supporting protrusions 1311C and 1311D are formed on one standing wall 1311B, and two supporting protrusions 1311E and 1311F are formed on the other standing wall 1311B. A space between the supporting protrusions 1311C and 1311E which are formed on the mutually different standing walls 1311B and are opposed to each other is smaller than the diameter of the ball portion 1033. The same is true for the opposing supporting protrusions 1311D and 1311F. A distance between the support protrusions 1311C and 1311D formed on the same standing wall 1311B is smaller than the diameter of the ball portion 1033, and the same is true for the support protrusions 1311D and 1311F.

Providing the ball portion 1033 so as to be surrounded by the four support protrusions 1311 C to 1311 F and assembling the lid portion 1032 restrict the ball portion 1033 from movement in the longitudinal direction of the wire harness 1002, and allow it to be rotatable within the support projections 1311C to 1311F. Since the ball portion 1033 is fixed to the main body side end portion 1221 of the corrugated tube 1022, the main body side end portion 1221 is rotatably supported in the longitudinal direction of the wire harness 1002 as a shaft by the base portion 1031, the lid portion 1032, and the ball portion 1033. That is, the base portion 1031, the lid portion 1032, and the ball portion 1033 function as a main body side support portion.

In the guide portion 1311, a space between the pair of standing walls 1311 B becomes larger as toward the slide door side from the support protrusions 1311C to 1311F, and opens at the slide door side, and the main body side end portion 1221 of the wire harness 1002 extends along the horizontal plane (a plane including the traveling direction and the vehicle width direction), and is provided so as to oscillate within the horizontal plane.

As shown in FIGS. 17 to 19, the door side unit 1004 includes a swing support portion 1041 that swingably supports the corrugated tube 1022 at a position away from the door side end portion 1222 (end portion on the side of the slide door), a first fixing portion 1042 for fixing the door side end portion 1222 to the slide door, and a second fixing portion 1043 for fixing the door side exposed portion 1212 of the electric wire 1021 to the slide door, and is arranged at the same height as the unit 1003 or at a position higher than the main body side unit 1003 in the vertical direction. The slide door includes a door main body forming an outer side surface of the vehicle body, and a door trim provided on an inner side of the vehicle body of the door main body. The door side unit 1004 is provided in a space between the door main body and the door trim so that the wire harness 1002 is concealed by the door trim.

The swing supporting portion 1041 has a base portion 1411 fixed to the slide door and a swinging portion 1412 fixed to the corrugated tube 1022. The swinging portion 1412 is attached so as to cover the corrugated tube 1022 from the outside and has, for example, a convex portion formed on the inner peripheral side thereof, and this convex portion meshes with a concave portion on the outer peripheral surface of the corrugated tube 1022, so that the part 1412 does not move in the longitudinal direction with respect to the corrugated tube 1022. Such a swinging portion 1412 is sandwiched by the base portion 1411 from the vehicle width direction and is swingably supported about the swing shaft 10A1 along the vehicle width direction. As a result, the corrugated tube 1022 is swingably supported about the swing shaft 10A1.

As shown in FIG. 20, the first fixing portion 1042 includes a belt-shaped winding portion 1421 wrapped about the outer periphery of the corrugated tube 1022, and a locking portion 1422 which is inserted and locked in the attachment hole 10P1 formed on a panel member 10P (door trim, door main body, etc.) constituting the slide door. The locking portion 1422 has, for example, an elastic piece 1422A that protrudes from the outer surface of the winding portion 1421 and is elastically deformable in a direction in which comes into contact with and separates from each other. The elastic piece 1422A is deformed so as to approach each other as it is inserted into the attachment hole 10P1, and is restored when the insertion is completed, and its tip is engaged with the inner peripheral edge of the attachment hole 10P1.

Like the first fixing portion 1042, the second fixing portion 1043 has a belt-shaped winding portion 1431 wound about the outer periphery of the electric wire 1021, and a locking portion 1432 inserted and locked in the mounting hole 10P1 of the panel member 10P. Incidentally, the attaching structure of the fixing portions 1042, 1043 to the wire harness 1002 and the fixing structure to the slide door are not limited to those described above, and the wire harness 1002 may be fixed at a predetermined position on the slide door.

As described above, the door side unit 1004 swingably supports the corrugated tube 1022 at the position away from the door side end portion 1222 by the swing support portion 1041, and by the fixing portions 1042, 1043, the wire harness 1002 is fixed to the slide door at the slide door side nearer than the unit 1041 the swing support. As a result, the wire harness 1002 can hardly deform between the position of the swing shaft 10A1 and the first fixing portion 1042 and between the first fixing portion 1042 and the second fixing portion 1043 even if the slide door slides. That is, the direction of the opening of the door-side end 1222 of the corrugated tube 1022 is kept substantially constant. The swing support portion 1041 and the first fixing portion 1042 are arranged at the same height and the second fixing portion 1043 is disposed at the position lower than the first fixing portion 1042, the wire harness 1002 is bent upwardly convex between them, and thereby the direction of the opening of the door side end portion 1222 is turned lower than the traveling direction (horizontal direction).

The swing portion 1412 swings in the swing support portion 1041 so that the portion of the wire harness 1002 closer to the main body than the swing portion 1412 is located on the rear side in the traveling direction when the slide door 10D is fully closed (FIG. 17), when in the half opened state, it is turned downward (FIG. 18), and when in the fully opened state, it is turned to the front side in the traveling direction (FIG. 19).

Hereinafter, how the wire harness 1002 bends when the slide door 10D slides will be described with reference to FIGS. 21(A) to 24(C). FIGS. 21(A) to 21(C) show sections of the corrugated tube 1022 where the bending restricting member 1023 is provided.

FIG. 21(A) shows the wire harness 1002 when the slide door 10D is fully closed, and FIGS. 22(A) to 22(C) show the appearance of the whole vehicle 10C when the slide door 10D is fully closed, the state of the power supply device 1001, and the relationship between the slide door 10D and the wire harness 1002 as seen from the inside of the vehicle, respectively. At this time, the door side unit 1004 is located on the front side in the traveling direction with respect to the main body side unit 1003, and the wire harness 1002 extends rearward from the door side unit 1004. Further, in the bending restricting member 1023 of the wire harness 1002, the band plate portion 1231 is oriented toward the vehicle interior side in the vehicle width direction. At this time, the entire wire harness 1002 extends in the horizontal plane and hardly bends in the vertical direction. Further, as shown in FIG. 22(C), the wire harness 1002 extending rearward from the door side unit 1004 is pulled out toward the main body side unit 1003 so as to pass through the rear end of the door trim 10T of the slide door 10D.

When the slide door 10D is slid to the rear side until it is in the half opened state, the state as shown in FIG. 21(B) is obtained. Further, the state of the entire vehicle 10 C at this time, the state of the power supply device 1001, and the relationship between the slide door 10 D and the wire harness 1002 as seen from the inside of the vehicle are shown in FIGS. 23(A) to (C). Along with sliding, the swinging part 1412 swings and faces downward, and the main body side end part 1221 of the corrugated tube 1022 rotates about the rotation axis along the longitudinal direction. In the half opened state, the swing portion 1412 faces downward, and the main body side end portion 1221 rotates by 90 degrees counterclockwise from the fully closed state when seeing the door side unit 1004 from the main body side unit 1003. Further, as the main body side unit 1003 and the door side unit 1004 come close to each other, the wire harness 1002 tries to bend.

As the main body side end portion 1221 rotates, the band plate portion 1231 of the bending restricting member 1023 is turned upward, and the bending restricting direction is turned upward. The wire harness 1002 bends convexly downward at the side of the slide door 10D (the portion where the bending restricting member 1023 is not provided), and at the vehicle body side (the portion where the bending restricting member 1023 is provided), the wire harness 1002 is bent upward so as to be restricted from bending and hanging downward. As a result, the bending restriction direction turns upward when the slide door 10D becomes the half opened state and, as shown in FIG. 21(B), the wire harness 1002 is bent convex downward on the side of the slide door 10D, and extends linearly on the main body side. At this time, the portion 1002A of the wire harness 1002 is positioned lower than when the slide door 10D is fully closed. As shown in FIG. 23(C), the wire harness 1002 extending downward from the door side unit 1004 is pulled out toward the main body side unit 1003 so as to pass through the lower end of the door trim 10T of the slide door 10D.

Note that the portion 1002A is a portion that becomes a vertex when the wire harness 1002 is bent convex downward, and is located, for example, approximately at the center of the entire corrugated tube 1022. In addition, the portion 1002A may be positioned closer to the main body side end portion 1221 than the center in the entire corrugated tube 1022, or may be positioned closer to the door side end portion 1222.

When the slide door 10D is slid to the rear side until the slide door 10D is fully opened, the state as shown in FIG. 21(C) is obtained. FIGS. 24(A) to 24(C) show the state of the entire vehicle 10C at this time, the state of the power supply device 1001, and the relationship between the slide door 10D and the wire harness 1002 as seen from the inside of the vehicle. Along with sliding, the swinging portion 1412 swings and faces the rear side in the traveling direction, and the main body side end portion 1221 of the corrugated tube 1022 rotates about the rotation axis along the longitudinal direction. In the fully opened state, when the swinging portion 1412 turns rearward, and the main body side end portion 1221 rotates 90 degrees counterclockwise from the half opened state to 90 degrees (fully closed state to 180 degrees), when viewing the door side unit 1004 from the main body side unit 1003.

As the main body side end portion 1221 rotates in this way, the band plate portion 1231 of the bending restricting member 1023 is turned toward the vehicle interior side in the vehicle width direction. In addition, the door side unit 1004 moves away from the main body side unit 1003, and the bending of the wire harness 1002 gradually decreases. As a result, when the slide door is in the fully opened state, the wire harness 1002 extends in the horizontal plane as shown in FIG. 21(C) with the bending allowable direction facing the vehicle outer side, and almost bends in the vertical direction. Accordingly, the part 1002A of the wire harness 1002 when the slide door 10 D is fully opened is located above compared to the case where the slide door 10D is in the half opened state. Further, as shown in FIG. 24(C), the wire harness 1002 extending from the door side unit 1004 toward the front side is pulled out toward the main body side unit 1003 so as to pass through the lower end of the door trim 10T of the slide door 10D.

Although the wire harness 1002 extending from the door side unit 1004 is drawn out so as to pass through the lower end or the rear end of the door trim according to the fully closed state, the half opened state, and the fully opened state of the slide door 10D as described above, the structure where the wiring harness 1002 is drawn out of the door harness 100T is not limited to this. That is, it suffices that the drawer structure corresponds to the shape of the door trim 10T, for example, the wire harness 1002 may be pulled out from the slide door 10D so as to always pass the lower end of the door trim 10T.

In the half opened state, the portion (supported portion) of the corrugated tube 1022 to which the swinging portion 1412 is fixed may not be completely downward. That is, even when the supported portion is slightly inclined with respect to the vertical direction in the half opened state, the supported portion may be more inclined rearward in the fully closed state than in the half opened state and the supported portion may be more inclined forward in the fully closed state than in the half opened state.

As described above, when the slide door 10D is slid in the opening direction, the wire harness 1002 is bent not only in the horizontal plane but also in the space including the vertical direction (that is, three-dimensionally). When the slide door 10D is slid in the closing direction, the respective portions of the power supply device 1001 move in the direction opposite to the case of sliding in the opening direction, and the fully closed state shown in FIGS. 21(C) and FIG. 22(A) to 22(C) is obtained from the fully opened state shown in FIG. 21(A) and FIGS. 24(A) to 24(C), through the half opened state shown in FIG. 21(B) and FIGS. 23(A) to 23(C).

According to this embodiment as described above, there are the following effects. That is, the swing support 1041 supports the corrugated tube 1022 at the position apart from the door side end 1222, allowing the electric wire 1021 to be covered by the corrugated tube 1022 on the slide door side nearer than the position swingably supported. Thereby, the electric wire 1021 can be protected from a mechanical impact on the slide door side. Furthermore, the wire harness 1002 is fixed to the slide door side near than the swing supporting portion 1041 by the fixing portions 1042, 1043, so that the direction of the end portion of the corrugated tube 1022 is oriented such that foreign matter is hard to enter, protecting the electric wire 1021 from foreign matter entering the corrugated tube 1022 on the slide door side.

Further, even without providing a protector for covering the electric wire 1021, the electric wire 1021 can be protected as described above. At this time, since only the fixing portions 1042, 1043 are provided for supporting the wire harness 1002 except the position of swing support, the entire device can be downsized as compared with the configuration provided with the protector.

Also, since the corrugated tube 1022 is swingably supported about the swing shaft 10A1 along the vehicle width direction, the wire harness 1002 can be bent in a convex manner not only in the horizontal direction but also in the vertical direction when the slide door is slid, and the wire harness 1002 can be deformed in an appropriate manner.

Further, since the door side end portion 1222 of the corrugated tube 1022 opens downwardly in the horizontal direction, foreign matter such as water and dust falling from above the wire harness 1002 does not easily enter the exterior member.

In addition, by using the corrugated tube 1022 as the exterior member, the wire harness 1002 can be easily bent when the slide door is slid.

It should be noted that the present invention is not limited to the above-described embodiment, and other configurations achieving the object of the present invention are included, and the following modifications and the like are also included in the present invention.

For example, in the above embodiment, the corrugated tube 1022 is swingably supported by the swing supporting portion 1041 about the swing shaft 10A1 along the vehicle width direction. However, the swing shaft may be rotated in the other direction, for example, the corrugated tube 1022 may be swingably supported so as to be capable of swinging about the swinging axis along the vertical direction by the swing support portion 1041 (that is, the structure in which the wire harness 1002 is bent in the horizontal plane may be used). In such a configuration as well, by properly setting the direction of the end portion of the corrugated tube 1022, it is possible to protect the electric wire 1021 from foreign matter.

Further, in the above embodiment, the door side end portion 1222 of the corrugated tube 1022 is opened in the direction lower than the horizontal direction, but the door side end portion 1222 may be oriented in the horizontal direction. Further, in a case where it is difficult for foreign matter to enter from the opening of the door-side end portion 1222 (for example, when a member or a portion or the like covering the opening is provided in the slide door), it is sufficient that the door side end portion 1222 opens with its facing in an appropriate direction, such as that the electric wire 1021 is easily wired.

In the above-described embodiment, the first fixing portion 1042 is fixed to the panel member 10P (door trim, door main body, or the like) constituting the slide door, but the first fixing portion may be fixed to an appropriate fixing object, and the object to be fixed may be, for example, an inner panel of a slide door or an electronic component provided in the slide door. That is, the first fixing portion is not limited to the structure in which the wire harness is directly fixed to the slide door by being directly fixed to the slide door, but the wire harness may be indirectly fixed to the slide door by being fixed to the slide door via the electronic component or the like.

In the above embodiment, though the door side unit 1004 includes the first fixing portion 1042 for fixing the corrugated tube 1022 to the slide door and the second fixing portion 1043 for fixing the electric wire 1021 to the slide door, the door side unit may have at least one fixing portion for fixing the wire harness 1002 to the slide door on the slide door side nearer than the swing supporting portion 1041. That is, the door side unit may have only one of the first fixing portion 1042 and the second fixing portion 1043, or in addition to the first fixing portion 1042 and the second fixing portion 1043, a further fixing portion may be provided.

Although the best configurations, methods, and the like for carrying out the present invention are disclosed in the above description, the present invention is not limited thereto. While the invention has been particularly shown and described with particular reference to certain embodiments thereof, it is evident that those skilled in the art can modify the above described embodiments in material, quantity, and other detailed configurations without departing from the spirit and scope of the invention. Accordingly, the description that limits the shape, material, and the like disclosed above is illustratively described in order to facilitate the understanding of the present invention, and does not limit the present invention, so the description with parts name removing the part or all of limitations such as the shape and material is included in the present invention.

DESCRIPTION OF SYMBOLS

1A power supply device
2, 5 wire harness
3 main body side unit
4, 4B door side unit
21 electric wire
22 corrugated tube
23 bending restricting member
2A part
221 main body side end portion
222 door side end
44 swing supporting portion
45 door side supporting portion
51 chain member
5A part
511 main body side end portion
512 door side end portion
D slide door
A1 swing axis
1 power supply device
1002 wire harness
1003 body side unit
1004 door side unit
1021 electric wire
1022 corrugated tube (exterior member)
1041 swing support portion
1042 first fixing portion
1043 second fixing portion
10C vehicle
10D slide door
10A1 swing axis

The invention claimed is:

1. A power supply device for supplying power from a vehicle main body to a slide door in a vehicle having the slide door sliding along a traveling direction, the power supply device comprising:
a wire harness provided from the vehicle main body to the slide door;
a main body side unit having a main body side support portion for supporting a main body side end portion of the wire harness, and fixable to the vehicle main body; and a door side unit having a door side support portion for supporting a door side end portion of the wire harness, and fixable to the slide door, wherein the wire harness is bent convexly downward so that at least a portion of the wire harness between the main body side end portion and the door side end portion is located lower when the slide door is in a half opened state than when the slide door is in a fully opened state or a fully closed state, wherein the main body side support portion rotatably supports the main body side end portion about a rotation axis along a longitudinal direction of the wire harness, wherein the wire harness includes one or more electric wires, a corrugated tube covering an outer periphery of the electric wire, and a bending restricting member provided on a side of the vehicle main body, wherein the bending restricting member extends along the electric wire, and has a bending allowance direction that allows bending and a bending restricting direction that faces an opposite side of the bending allowance direction and restricts bending, wherein the main body side support portion supports the main body side end portion so as to extend along a horizontal plane, and wherein the bending restricting member turns the bending restricting direction upward when the slide door is in the half opened state.

2. The power supply device according to claim 1, wherein the corrugated tube is formed in a cylindrical shape.

3. The power supply device according to claim 1, wherein the door side support portion rotatably supports the door side end portion about the rotation axis along the longitudinal direction of the wire harness, wherein the wire harness includes one or more electric wires and a chain member provided on the outer periphery of the electric wire, wherein the chain member has a bendable direction in which a whole of the chain member is bendable and an unbendable direction crossing the bendable direction, and wherein as the slide door slides, the entire wire harness rotates and the chain member changes direction.

* * * * *